United States Patent
Tada et al.

(10) Patent No.: US 11,668,368 B2
(45) Date of Patent: Jun. 6, 2023

(54) DAMPER, ASSEMBLY, AND ELECTRONIC CONTROLLER

(71) Applicant: DENSO CORPORATION, Kariya (JP)

(72) Inventors: Shingo Tada, Kariya (JP); Ryoichi Shinoda, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/524,915

(22) Filed: Nov. 12, 2021

(65) Prior Publication Data
US 2022/0154802 A1  May 19, 2022

(30) Foreign Application Priority Data

Nov. 19, 2020 (JP) .............................. JP2020-192578

(51) Int. Cl.
*F16F 1/362* (2006.01)
*F16F 15/12* (2006.01)

(52) U.S. Cl.
CPC ...... *F16F 15/1201* (2013.01); *F16F 15/1207* (2013.01)

(58) Field of Classification Search
CPC .... F16F 15/1201; F16F 15/1207; F16F 15/04; F16F 15/06; F16F 15/08; F16F 1/44; F16F 1/362
See application file for complete search history.

(56) References Cited

U.S. PATENT DOCUMENTS

| | | | | |
|---|---|---|---|---|
| 4,161,812 A | * | 7/1979 | Litch, III | ................ H02K 5/24 29/446 |
| 4,514,458 A | * | 4/1985 | Thorn | ..................... F16F 1/362 428/605 |
| 6,003,897 A | * | 12/1999 | Dostert | .................. B62D 21/11 248/638 |
| 6,029,942 A | * | 2/2000 | Daddis, Jr. | .......... F04B 39/0044 248/673 |
| 6,129,326 A | * | 10/2000 | Mandon | .................. B32B 15/04 428/626 |

(Continued)

FOREIGN PATENT DOCUMENTS

| | | |
|---|---|---|
| JP | H06-320051 A | 11/1994 |
| JP | 2001-096796 A | 4/2001 |

(Continued)

OTHER PUBLICATIONS

U.S. Appl. No. 17/524,795, filed Nov. 12, 2021, Tada et al.

*Primary Examiner* — Thomas W Irvin
(74) *Attorney, Agent, or Firm* — Posz Law Group, PLC

(57) ABSTRACT

A damper is disposed in at least one of a space between a supported member and a supporting element or a space between the supported member and a supporting member. The damper includes a cushioning member and a protecting member. The cushioning member is configured to relax stress applied to the supported member that is supported by the supporting member together with the supporting element. The cushioning member includes a facing portion that faces the supported member, an opposite portion that is opposite to the facing portion, and a side surface portion that is located between the facing portion and the opposite portion. The protecting member is disposed on the side surface portion to cover the cushioning member from an outside of the cushioning member.

8 Claims, 12 Drawing Sheets

(56) References Cited

U.S. PATENT DOCUMENTS

| | | | | |
|---|---|---|---|---|
| 6,328,513 | B1* | 12/2001 | Niwa | G10K 11/168 411/339 |
| 6,347,790 | B1* | 2/2002 | Nishibori | E01F 15/145 428/362 |
| 6,354,558 | B1* | 3/2002 | Li | F16F 1/3732 248/673 |
| 7,065,963 | B2* | 6/2006 | Niwa | F16F 3/04 411/262 |
| 8,454,290 | B2* | 6/2013 | Schaser | F16B 5/0258 411/902 |
| 8,536,480 | B2* | 9/2013 | Miwa | B23K 11/314 219/86.25 |
| 9,291,234 | B1* | 3/2016 | Green | B65D 19/38 |
| 9,297,297 | B2* | 3/2016 | Chu | F02B 37/18 |
| 9,309,949 | B2* | 4/2016 | Kaneko | F16F 1/376 |
| 11,162,408 | B2* | 11/2021 | Heiselbetz | F01N 13/102 |
| 11,333,216 | B2* | 5/2022 | Kato | F02B 77/13 |
| 2005/0039992 | A1 | 2/2005 | Hurwic | |
| 2005/0040576 | A1* | 2/2005 | Oxenknecht | F16F 1/3735 267/293 |
| 2009/0173588 | A1* | 7/2009 | Gelbard | F16F 9/003 188/269 |
| 2011/0155699 | A1* | 6/2011 | Miwa | B23K 11/36 219/86.25 |
| 2013/0139502 | A1* | 6/2013 | Chu | F02B 37/186 411/545 |
| 2019/0136930 | A1* | 5/2019 | Caron-L'Ecuyer | F16F 1/3732 |
| 2019/0145300 | A1* | 5/2019 | Heiselbetz | B60R 13/0876 181/240 |
| 2022/0186809 | A1* | 6/2022 | Horibe | F16F 1/3735 |
| 2022/0210932 | A1* | 6/2022 | Tada | F16F 15/08 |
| 2023/0028093 | A1* | 1/2023 | Protzmann | F16F 1/3835 |

FOREIGN PATENT DOCUMENTS

| | | |
|---|---|---|
| JP | 2004-031977 A | 1/2004 |
| JP | 2009-087976 A | 4/2009 |
| JP | 2010-064219 A | 3/2010 |
| JP | 2014-095441 A | 5/2014 |

* cited by examiner

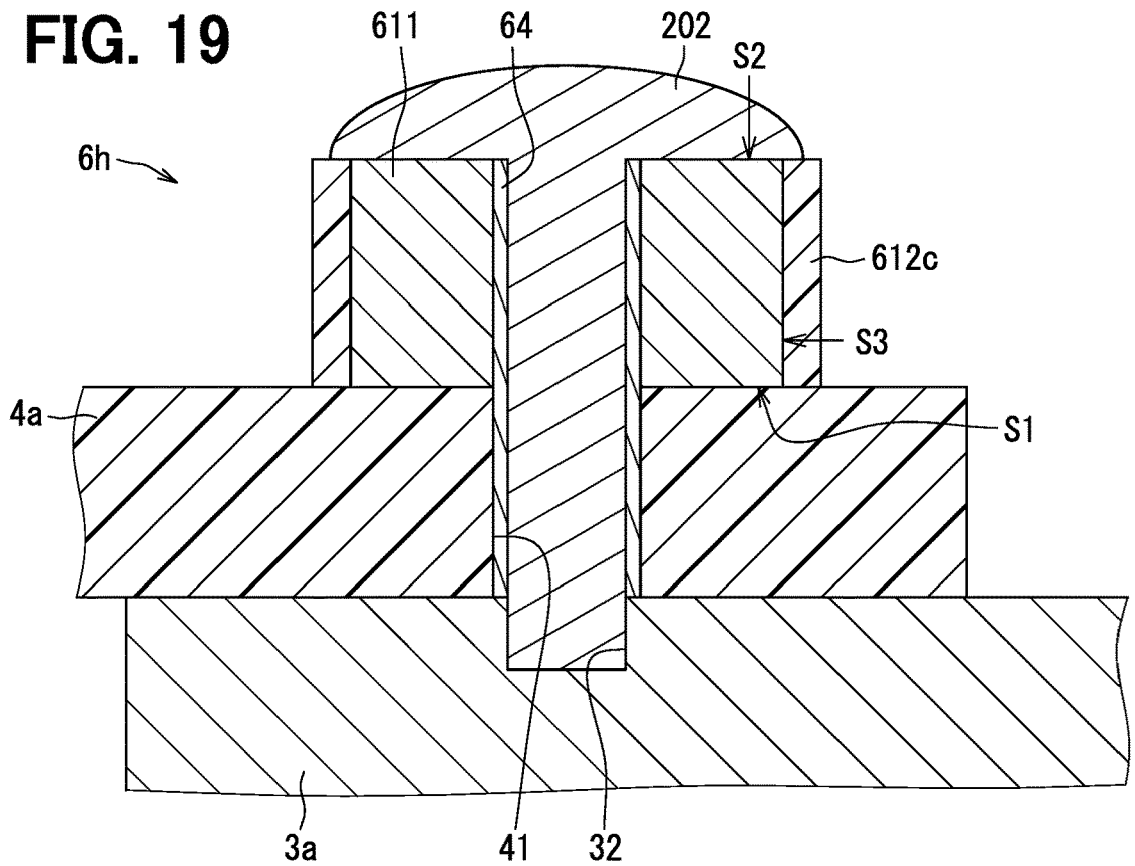
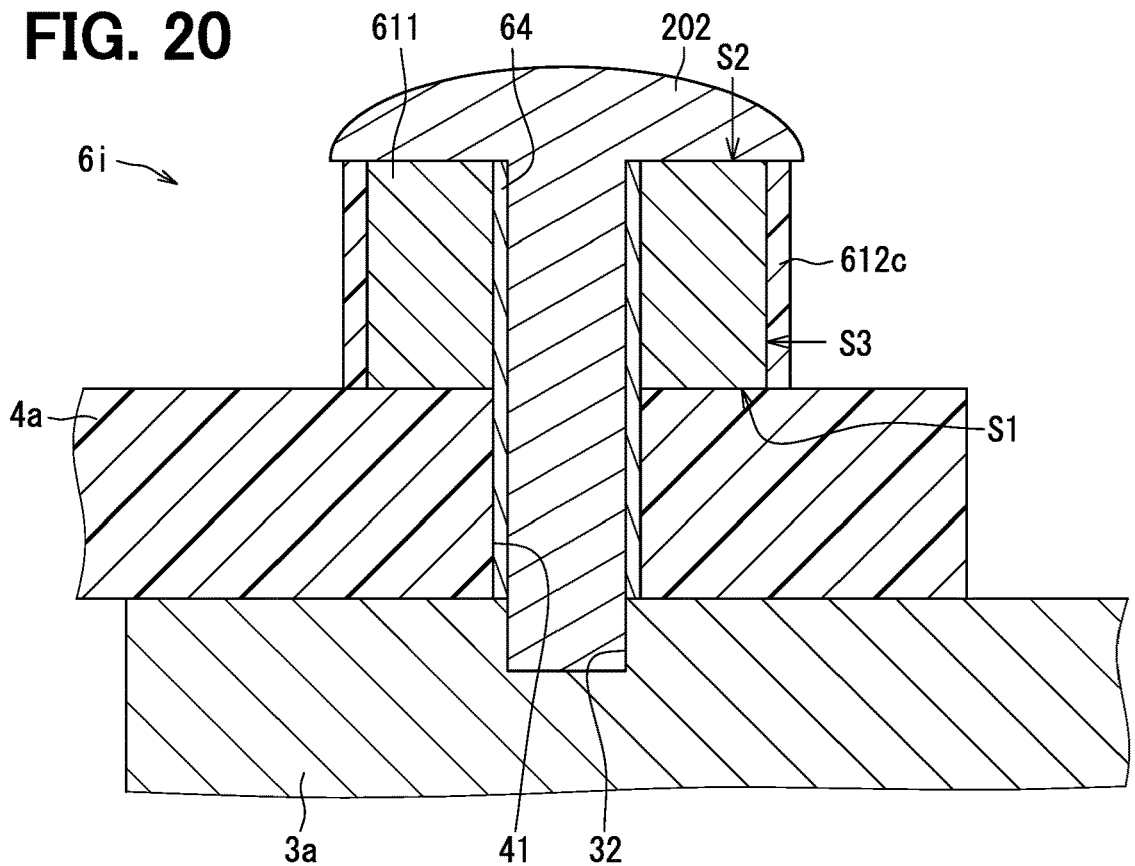

DAMPER, ASSEMBLY, AND ELECTRONIC CONTROLLER

CROSS REFERENCE TO RELATED APPLICATION

This application is based on Japanese Patent Application No. 2020-192578 filed on Nov. 19, 2020, the disclosure of which is incorporated herein by reference in its entirety.

TECHNICAL FIELD

The present disclosure relates to a damper, an assembly, and an electronic controller.

BACKGROUND ART

As an example of a damper, there is an anti-vibration bush. The anti-vibration bush has an inner tubular body made of metal, an outer tubular body made of rubber, and a washer. The outer tubular body is fixed to an outer surface of the inner tubular body. The washer is fixed to a surface of the outer tubular body facing a screw head.

SUMMARY

A damper is disposed in at least one of a space between a supported member and a supporting element or a space between the supported member and a supporting member. The damper includes a cushioning member and a protecting member. The cushioning member is configured to relax stress applied to the supported member that is supported by the supporting member together with the supporting element. The cushioning member includes a facing portion that faces the supported member, an opposite portion that is opposite to the facing portion, and a side surface portion that is located between the facing portion and the opposite portion. The protecting member is disposed on the side surface portion to cover the cushioning member from an outside of the cushioning member.

According to another aspect of the present disclosure, a damper is disposed in at least one of a space between a supported member and a supporting element or a space between the supported member and a supporting member. The damper includes a cushioning member, a first cover, and a second cover. The cushioning member is configured to relax stress applied to the supported member that is supported by the supporting member together with the supporting element. The cushioning member includes a facing portion that faces the supported member, an opposite portion that is opposite to the facing portion, and a side surface portion that is located between the facing portion and the opposite portion. The first cover includes a first wall that covers the opposite portion of the cushioning member and a first side wall that protrudes from the first wall to face the side surface portion. The second cover includes a second wall that covers the facing portion of the cushioning member and a second side wall that protrudes from the second wall to face both the side surface portion and the first side wall.

BRIEF DESCRIPTION OF DRAWINGS

FIG. 19 is a cross-sectional view illustrating a schematic configuration of a damper of a fourth embodiment.

FIG. 20 is a cross-sectional view illustrating a schematic configuration of a damper of a tenth modification.

DESCRIPTION OF EMBODIMENTS

Figure 1:
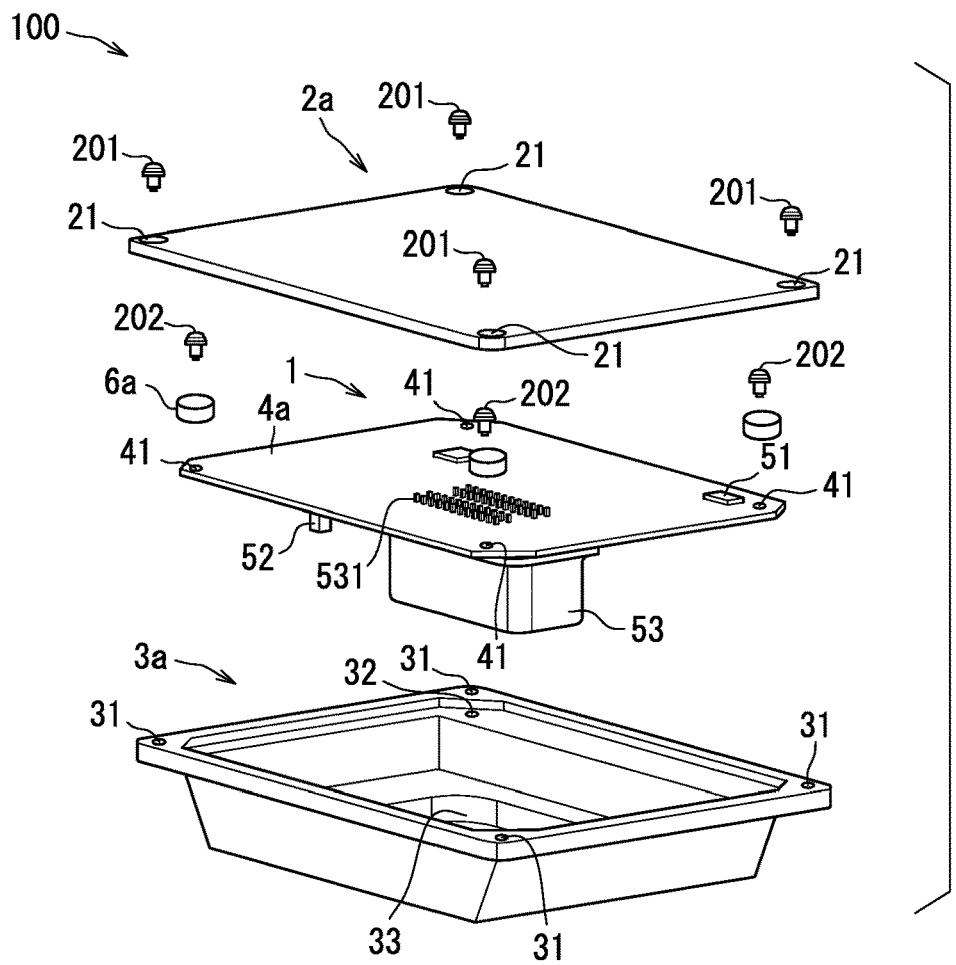
FIG. 1 is a perspective exploded view illustrating a schematic configuration of an electronic controller of a first embodiment.

To begin with, examples of relevant techniques will be described.

As an example of a damper, there is an anti-vibration bush. The anti-vibration bush has an inner tubular body made of metal, an outer tubular body made of rubber, and a washer. The outer tubular body is fixed to an outer surface of the inner tubular body. The washer is fixed to a surface of the outer tubular body facing a screw head.

Since foreign matters may adhere to the outer tubular body that is made of rubber, further improvement is required in the anti-vibration bush.

It is the first object of the present disclosure to provide an improved damper, an assembly, and an electronic controller. It is another object of the present disclosure to provide a damper that restricts deterioration of the damper. It is another object of the present disclosure to provide an assembly that can reliably relax stress. It is another object of the present disclosure to provide an electronic controller that can restrict stress from being applied to the electronic controller.

A damper disclosed here is disposed in at least one of a space between a supported member and a supporting element or a space between the supported member and a supporting member. The damper includes a cushioning member and a protecting member. The cushioning member is configured to relax stress applied to the supported member that is supported by the supporting member together with the supporting element. The cushioning member includes a facing portion that faces the supported member, an opposite portion that is opposite to the facing portion, and a side surface portion that is located between the facing portion and the opposite portion. The protecting member is disposed on the side surface portion to cover the cushioning member from an outside of the cushioning member.

According to the damper disclosed here, the protecting member is disposed on the side surface portion of the cushioning member. Thus, the damper can restrict foreign matters from adhering to the cushioning member, thereby restricting deterioration of the damper.

According to another aspect of the present disclosure, a damper is disposed in at least one of a space between a supported member and a supporting element or a space between the supported member and a supporting member. The damper includes a cushioning member, a first cover, and a second cover. The cushioning member is configured to relax stress applied to the supported member that is supported by the supporting member together with the supporting element. The cushioning member includes a facing portion that faces the supported member, an opposite portion that is opposite to the facing portion, and a side surface portion that is located between the facing portion and the opposite portion. The first cover includes a first wall that covers the opposite portion of the cushioning member and a first side wall that protrudes from the first wall to face the side surface portion. The second cover includes a second wall that covers the facing portion of the cushioning member and a second side wall that protrudes from the second wall to face both the side surface portion and the first side wall.

According to the damper disclosed here, the first side wall and the second side wall are disposed to face the side surface portion of the cushioning member. Thus, the damper can restrict foreign matters from adhering to the cushioning member, thereby restricting deterioration of the damper.

An assembly disclosed here includes the damper, the supported member, and a conductive connecting member connecting the damper to the supported member. The second cover of the damper has a conductivity. A conductive mounting pattern is mounted on a surface of the supported member. The conductive connecting member connects the second cover of the damper to the conductive pattern of the supported member, so that the damper is mounted on a surface of the supported member.

According to the assembly disclosed here, since the damper is provided, the stress applied to the supported member can be reliably relaxed. Further, since the damper is mounted on the surface of the supported member, it is possible to restrict the damper from being displaced.

An electronic controller disclosed here includes the damper, the supported member, the supporting member, and the supporting element. The supported member is a circuit board in which an electronic component and a conductive wiring are provided at an insulating substrate that has an electric insulation property. The damper is disposed in at least one of a space between the circuit board and the supporting element or a space between the circuit board and the supporting member. The circuit board is supported by the supporting member.

According to the electronic controller disclosed here, the damper is arranged in at least one of a space between the circuit board and the supporting element or a space between the circuit board and the supporting member, so that the stress to the supported member is surely relaxed. Thus, the electronic controller can restrict stress from being applied to the electronic component or a connecting portion between the electronic component and the insulating substrate.

The disclosed aspects in this specification adopt different technical solutions from each other in order to achieve their respective objects. The objects, features, and advantages disclosed in this specification will become apparent by referring to following detailed descriptions and accompanying drawings.

Hereinafter, multiple embodiments of the present disclosure will be described with reference to the drawings. In each embodiment, portions corresponding to those described in the preceding embodiment are denoted by the same reference numerals, and redundant descriptions will be omitted in some cases. In each of the embodiments, when only a part of the configuration is explained, the other part of the embodiment can be referred to the other embodiment explained previously and applied.

First Embodiment

With reference to FIGS. 1 to 6, an electronic controller 100 and a damper 6a disposed in the electronic controller 100 of the present embodiment will be described.

<Electronic Controller>

Figure 2:
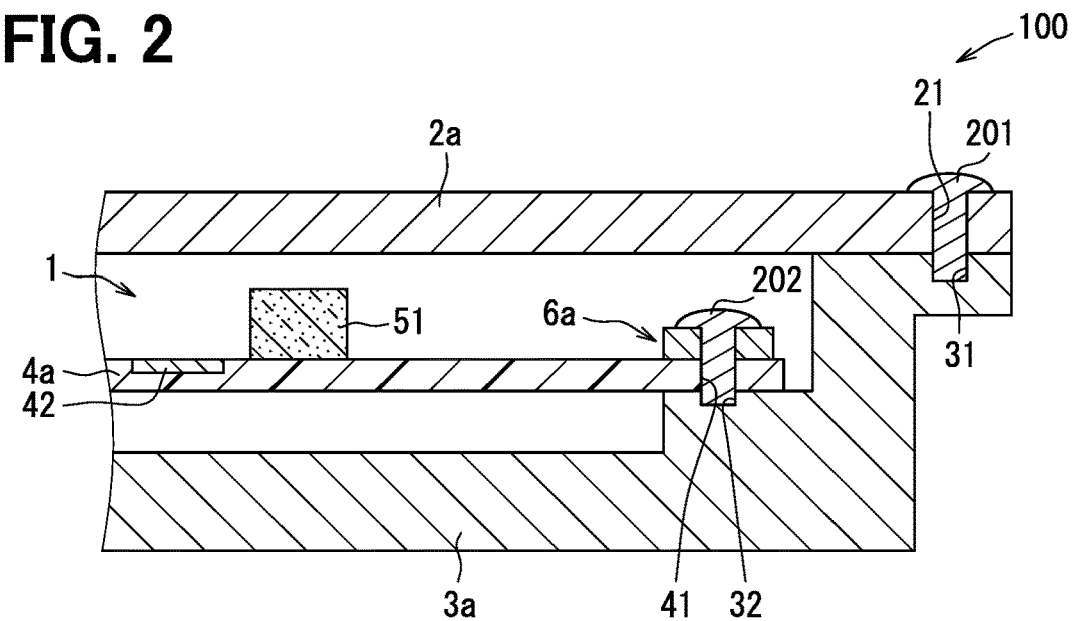
FIG. 2 is a cross-sectional view illustrating a schematic configuration of the electronic controller of the first embodiment.
Figure 3:
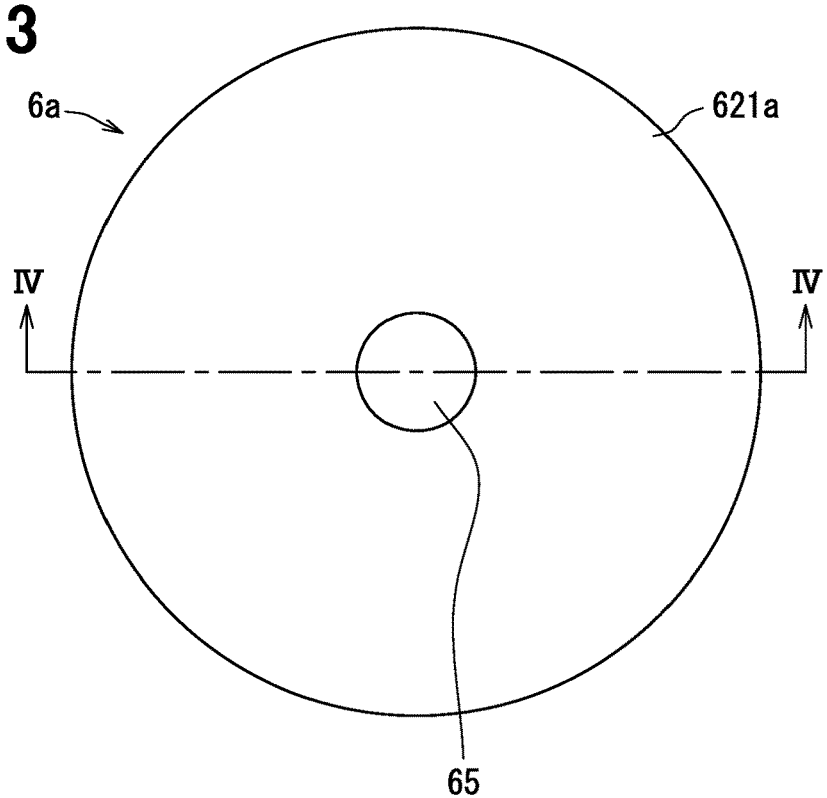
FIG. 3 is a plan view illustrating a schematic configuration of a damper of the first embodiment.

First, with reference to FIGS. 1 and 2, the electronic controller 100 will be described. The electronic controller 100 includes a circuit board 1, a cover 2a, a base 3a, dampers 6a, and the like. The electronic controller 100 is configured to be installed in a vehicle, for example. Thus, the electronic controller 100 can be applied to a controller that controls an in-vehicle device. In FIGS. 1 and 2, illustrations of the dampers 6a are simplified.

The circuit board 1 corresponds to a supported member. The circuit board 1 includes an insulating substrate 4a, circuit elements 51 and 52, a connector 53, and the like. The insulating substrate 4a is a substrate having an electrical insulating property such as resin or ceramic. The insulating substrate 4a defines second insertion holes 41 passing through the insulating substrate 4a in the thickness direction. The second insertion holes 21 are holes into which second screws 202 are inserted. The second insertion holes 41 are defined, for example, at the four corners of the insulating substrate 4a. In this embodiment, as an example, the circuit board 1 provided with the connector 53 is adopted. However, the present disclosure can be adopted even in the circuit board 1 without the connector 53.

The insulating substrate 4a is provided with a wiring pattern 42 that is a part of a conductive wiring. The wiring pattern 42 is provided on a surface or inside of the insulating substrate 4a. The circuit board 1 may be a multi-layer board in which wiring patterns 42 and the insulating substrates 4a are alternately stacked with each other, a single-layer board in which a single-layer wiring pattern 42 is provided on the insulating substrate 4a, or the like.

Each of the circuit elements 51 and 52 and the connector 53 corresponds to an electronic component. The circuit elements 51, 52 and the connector 53 are mounted on the insulating substrate 4a.

Each of the circuit elements 51 and 52 is, for example, a semiconductor switching element, a resistance element, a capacitor, or the like. The circuit element 51 is mounted on a first surface of the insulating substrate 4a. On the other hand, the circuit element 52 is mounted on a second surface of the insulating substrate 4a opposite to the first surface. More specifically, the circuit elements 51 and 52 are mounted on the insulating substrate 4a with a conductive connecting member. Further, the circuit elements 51 and 52 are electrically connected to the wiring pattern 42 with the connecting member.

The number of the circuit elements 51 and 52 is not limited to that shown in FIG. 1. Further, in the present embodiment, solder is adopted as an example of the conductive connecting member. However, the conductive connecting member is not limited to solder, and other members such as silver paste can also be used. The solder and the wiring pattern 42 can be regarded as connecting portions between the electronic components and the insulating substrate 4a.

The connector 53 includes a connector case that holds terminals 531. The connector 53 is mounted on the insulating substrate 4a such that the terminals 531 and the wiring electrically are connected to each other with solder. The connector 53 is provided for electrical connection between the electronic controller 100 and an external device provided outside the electronic controller 100. The external device is another electronic controller, a device to be controlled, or the like. Further, the connector 53 may be, for example, an interface for connecting to a communication line of an in-vehicle network. That is, in this embodiment, the connector 53 is adopted as an example of the interface.

As shown in FIG. 2, the circuit board 1 is supported by the base 3a with the second screws 202. More specifically, the circuit board 1 is supported by the base 3a with the second screws 202 via the dampers 6a. Further, the circuit board 1 is supported by the base 3a by the multiple second screws 202. In this embodiment, as an example, the four second screws 202 are used to support the circuit board 1 on the base 3a. The dampers 6a are arranged respectively between the second screws 202 and the circuit board 1.

Each of the second screws 202 corresponds to a supporting element. The second screw 202 may contain a metal as a main component. The second screw 202 has a columnar portion provided with a male thread and a screw head located at an end of the columnar portion. As shown in FIG. 2, the columnar portion of the second screw 202 is inserted into the second insertion hole 41 and a cover opening portion 65 of the damper 6a, and a portion of the columnar portion is screwed into the second screw hole 32 (female thread) defined in the base 3a.

In this way, the male threads of the second screws 202 and the female threads of the second screw holes 32 are engaged with each other, thereby supporting the circuit board 1 on the base 3a. Further, in other words, the circuit board 1 is screwed to the base 3a by the second screws 202. In this state, the screw heads of the second screws 202 press the dampers 6a. The damper 6a will be described in detail later.

The cover 2a and the base 3a configure housing for the circuit board 1. The cover 2a and the base 3a are assembled to each other to define a housing space for the circuit board 1. The cover 2a and the base 3a are mainly composed of a metal such as aluminum. Thus, the cover 2a and the base 3a have conductivity.

However, the housing is not limited to this. For example, the cover 2a and the base 3a may be composed mainly of a resin or the like. Further, only one of the cover 2a and the base 3a may be composed of a metal as a main component.

The cover 2a is, for example, a plate-shaped member. The cover 2a defines first insertion holes 21 passing through the cover in the thickness direction. The first insertion holes 21 are defined at four corners of the cover 2a, for example. The first insertion holes 21 are holes into which first screws 201 are inserted.

The base 3a corresponds to a supporting member. The base 3a is, for example, a box-shaped member having a recess. The base 3a defines first screw holes 31, the second screw holes 32, and a connector hole 33. The first screw holes 31 are female threads like the second screw holes 32. The first screw holes 31 are defined at four corners of the base 3a, for example. Further, the first screw holes 31 are defined, for example, in a flange of the base 3a. Further, the first screw holes 31 are defined in positions to face the first insertion holes 21 when the cover 2a and the base 3a are disposed to face each other.

The second screw holes 32 are defined in an arranging portion of the base 3a on which the circuit board 1 is disposed. For example, the second screw holes 32 are defined to face four corners of the circuit board 1. More specifically, the second screw holes 32 are defined in positions to face the second insertion holes 41 when the circuit board 1 is disposed on the arranging portion.

The connector hole 33 is a through hole defined in a bottom of the base 3a. The connector hole 33 has an opening shape corresponding to an outer shape of the connector 53. The connector 53 is inserted into the connector hole 33 with the circuit board 1 arranged on the arranging portion. The connector hole 33 is not necessarily defined in the base 3a.

The first screw 201 has the same configuration as the second screw 202. As shown in FIG. 2, the columnar portion of the first screw 201 is inserted into the first insertion hole 21 and a portion of the columnar portion is screwed into the first screw hole 31 defined in the base 3a. That is, the cover 2a is fixed to the base 3a by engaging the male threads of the first screws 201 with the female threads of the first screw holes 31. Further, in other words, the cover 2a and the base 3a are fixed to each other with the first screws 201.

<Damper>

Next, with reference to FIGS. 2 to 6, the damper 6a will be described.

The damper 6a is a member for relieving stress (external force) to the circuit board 1. For example, the damper 6a absorbs impact applied to the circuit board 1. The damper 6a protects the circuit board 1 from stresses such as assembly strain, thermal shock and vibration. That is, the damper 6a is provided for restricting cracks in the solder, the wiring pattern 42, and the like, and for restricting malfunctions in the electronic components due to the impact applied to the circuit board 1.

As shown in FIG. 2, the damper 6a is arranged between the circuit board 1 and the screw head of the second screw 202 and the circuit board 1 is supported by the base 3a with the second screw 202. However, the position of the damper 6a is not limited to this. The damper 6a may be arranged in at least one of a space between the circuit board 1 and the second screw 202 (screw head) and a space between the circuit board 1 and the base 3a. Thus, the damper 6a may be arranged in only the space between the circuit board 1 and the base 3a. Further, the dampers 6a may be arranged in both the space between the circuit board 1 and the second screw 202 and the space between the circuit board 1 and the base 3a.

As described above, the damper 6a is disposed between the circuit board 1 and the screw head of the second screw 202. Thus, when the second screw 202 is screwed into the base 3a, the circuit board 1 itself is not fixed to the base 3a. That is, when the second screw 202 is screwed into the base 3a, movement (displacement) of the circuit board 1 in an up-down direction is not completely restricted. The circuit board 1 is supported by the base 3a such that the circuit board 1 can move by amount in which the damper 6a elastically deforms. The up-down direction is the same as the thickness direction.

Figure 4:
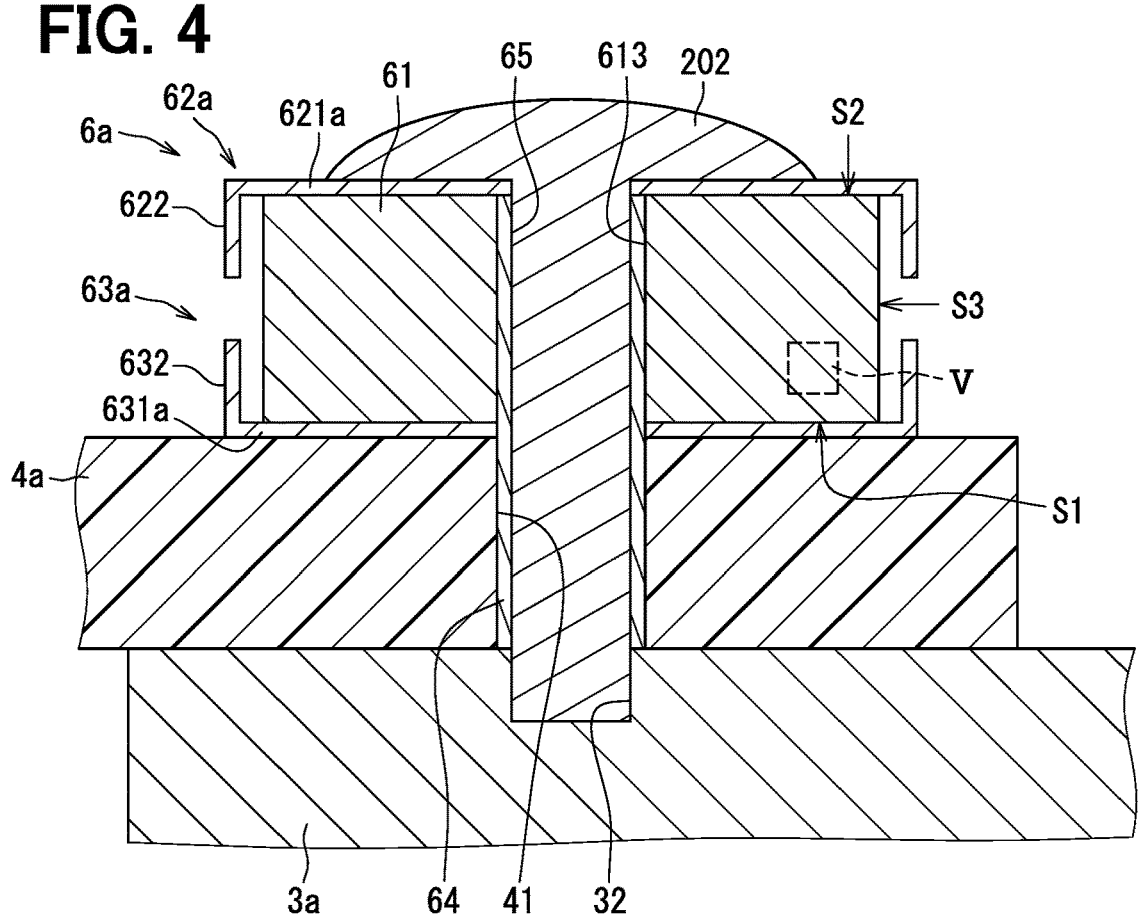
FIG. 4 is an enlarged view of the damper, a circuit board, and a base of the first embodiment.

As shown in FIGS. 3, 4, 5, and 6, the damper 6a includes a shock-absorbing member 611, a protecting member 612a, a first cover 62a, a second cover 63a, and a height adjusting member 64. The shock-absorbing member 611 corresponds to a cushioning member. The shock-absorbing member 611 and the protecting member 612a constitute an absorbing structure 61. That is, the absorbing structure 61 includes the shock-absorbing member 611 and the protecting member 612a. FIG. 4 is a cross-sectional view of the damper 6a taken along a line IV-IV in FIG. 3.

Figure 5:
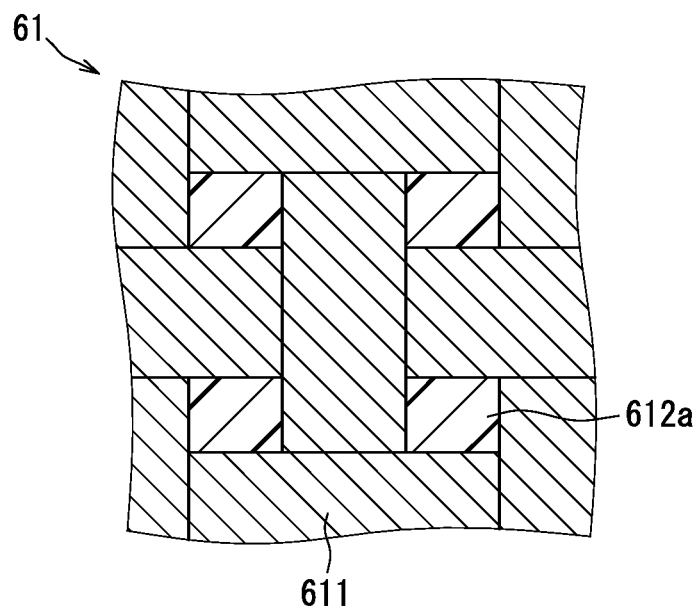
FIG. 5 is an enlarged view of a portion V in FIG. 4.
Figure 6:
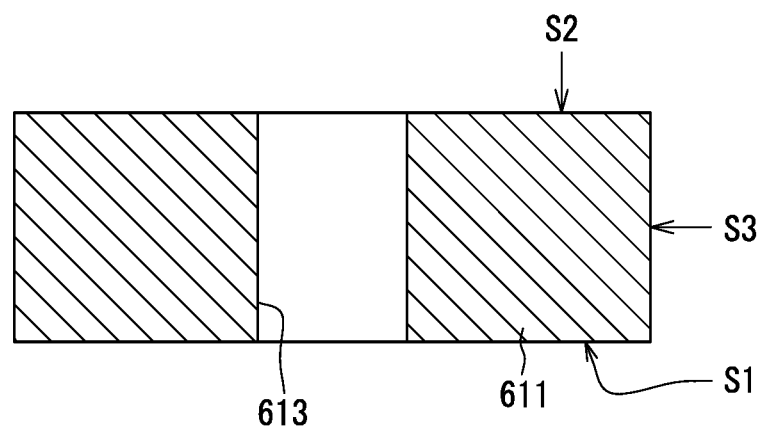
FIG. 6 is a cross-sectional view illustrating a schematic configuration of a shock-absorbing member of the first embodiment.

As shown in FIGS. 5 and 6, in this embodiment, a wire mesh is adopted as an example of the shock-absorbing member 611. The wire mesh is woven metal wires with spaces defined therein. The wire mesh is not limited to one in which the metal wires are woven regularly. The wire mesh may be formed by intricately weaving the metal wires such that the metal wires are entangled with each other. Further, the wire mesh can be referred to as a continuous porous body in which the metal wires are entangled. Further, in other words, the wire mesh is formed by compressing the metal wires that are entangled with each other. The wire mesh can be referred to as a metal cushioning member. As the metal wire, for example, stainless steel or the like can be adopted. However, the metal wire is not limited to stainless steel. The metal wire may be aluminum, iron, or the like.

The shock-absorbing member 611 is configured to be elastically deformed with stress. The shock-absorbing member 611 is anything as long as it is elastically deformed when external force is applied to it at least in the up-down direction when the shock-absorbing member 611 is disposed between the circuit board 1 and the screw head of the second screw 202. In the damper 6a, the shock-absorbing member 611 mainly has a function of relieving stress. The shock-absorbing member 611 can also be rephrased as a stress relieving member.

As shown in FIG. 4, the shock-absorbing member 611 has a facing portion S1 facing the circuit board 1, an opposite portion S2 opposite to the facing portion S1, and a side surface portion S3 disposed between the facing portion S1 and the opposite portion S2. The facing portion S1 is a surface of the shock-absorbing member 611 facing the circuit board 1. Thus, the facing portion S1 is also referred to as a facing surface S1. Further, the opposite portion S2 is also referred to as an opposite surface S2 of the shock-absorbing member 611 that is opposite to the facing surface S1. The side surface portion S3 is also referred to as a side surface S3 of the shock-absorbing member 611. The distance between the facing surface S1 and the opposite surface S2 is the same as the thickness of the shock-absorbing member 611.

The facing surface S1 and the opposite surface S2 are, for example, flat surfaces parallel to each other. The facing surface S1 and the opposite surface S2 are parallel to the insulating substrate 4a when the damper 6a is arranged on the circuit board 1. However, the present disclosure is not limited to this. The facing surface S1 and the opposite surface S2 are not necessarily flat. Further, the facing surface S1 and the opposite surface S2 are not necessarily parallel to the insulating substrate 4a.

The side surface S3 is a surface connected to both the facing surface S1 and the opposite surface S2. Further, the side surface S3 extends along a virtual plane that intersects the facing surface S1 and the opposite surface S2. For example, the side surface S3 is perpendicular to the facing surface S1 and the opposite surface S2. Further, the side surface S3 is annularly provided on the outer circumference of the shock-absorbing member 611. Thus, the side surface S3 is different from a surface that defines an absorbing member hole 613 which will be described later. The side surface S3 is also referred to as an outer circumferential surface of the shock-absorbing member 611. On the other hand, the surface defining the absorbing member hole 613 is also referred to as an inner circumferential surface.

In the present disclosure, even if there is unevenness on a surface due to the metal wires or the protecting member 612a, which will be described later, the surface is regarded as a flat surface. It goes without saying that a surface without unevenness caused by the metal wires or the protecting member 612a, which will be described later, is included in the flat surface.

As shown in FIGS. 4 and 6, the shock-absorbing member 611 defines the absorbing member hole 613. The absorbing member hole 613 corresponds to a through hole. The absorbing member hole 613 is a hole extending between the facing surface S1 and the opposite surface S2. Thus, it can be said that the shock-absorbing member 611 has a tubular shape. A part of the height adjusting member 64 and a part of the second screw 202 are inserted into the absorbing member hole 613.

The protecting member 612a is provided for protecting the shock-absorbing member 611 so as not to deteriorate its function. That is, the protecting member 612a restricts foreign matters from adhering to the shock-absorbing member 611 so as to suppress deterioration of the function of the shock-absorbing member 611. Further, the protecting member 612a also restricts scrap metal and the like from falling out from the shock-absorbing member 611.

The protecting member 612a is arranged on the side surface S3 of the shock-absorbing member 611. Further, as shown in FIG. 5, in the present embodiment, the protecting member 612a is disposed in spaces in the shock-absorbing member 611 in addition to on the side surface S3 of the shock-absorbing member 611. Further, the protecting member 612a is arranged to entirely cover the side surface S3. The protecting member 612a separates the shock-absorbing member 611 from the outside of the shock-absorbing member 611. Further, it can be said that the protecting member 612a covers at least the side surface S3 of the shock-absorbing member 611. The outside of the shock-absorbing member 611 can be referred to as the vicinity of the shock-absorbing member 611 or an external environment of the shock-absorbing member 611.

The protecting member 612a is made of a viscous material. In other words, the protecting member 612a is composed mainly of an organic substance having viscoelasticity. Further, as the protecting member 612a, for example, a silicone or the like can be adopted. The viscosity of the protecting member 612a changes by UV curing or the like.

The protecting member 612a soaks into the shock-absorbing member 611, thereby the protecting member 612a is disposed on the side surface S3 and in the spaces in the shock-absorbing member 611. Then, the viscosity of the protecting member 612a can be adjusted by irradiating, with ultraviolet, the shock-absorbing member 611 with the protecting member 612a disposed in the spaces. At this time, the viscosity is adjusted so that the characteristics of the damper 6a has desired values. Further, in other words, the compressibility of the absorbing structure 61 is adjusted to a desired value by adjusting the viscosity of the protecting member 612*a*.

As shown in FIG. 4, the absorbing structure 61 is partially covered with the first cover 62*a* and the second cover 63*a*. That is, the absorbing structure 61 is held between the first cover 62*a* and the second cover 63*a*. That is, the first cover 62*a* and the second cover 63*a* are arranged to face each other across the absorbing structure 61. Further, the first cover 62*a* and the second cover 63*a* are moved closer to or further from each other because the absorbing structure 61 is elastically deformed.

The first cover 62*a* includes a first cover facing wall 621*a* and a first cover side wall 622. The first cover 62*a* is an annular member that covers at least the opposite surface S2 of the shock-absorbing member 611. That is, the first cover 62*a* includes the annular first cover facing wall 621*a* and the annular first cover side wall 622. The first cover facing wall 621*a* is integrally formed with the first cover side wall 622, for example. The first cover facing wall 621*a* corresponds to a first wall. The first cover side wall 622 corresponds to a first side wall.

The first cover facing wall 621*a* is a portion arranged to face the opposite surface S2 of the shock-absorbing member 611. The first cover facing wall 621*a* is attached to the shock-absorbing member 611 to be in contact with the opposite surface S2. The first cover facing wall 621*a* of the first cover 62*a* covers the opposite surface S2. Further, it is preferable that the first cover facing wall 621*a* entirely cover the opposite surface S2. The first cover facing wall 621*a* of the present embodiment is a portion in contact with the screw head of the second screw 202.

The first cover side wall 622 protrudes from an end of the first cover facing wall 621*a*, for example. The first cover side wall 622 is a portion to face at least a portion of the side surface S3 of the shock-absorbing member 611. In the present embodiment, as an example, the first cover side wall 622 faces a portion, in the thickness direction of the shock-absorbing member 611, of the side surface S3 of the shock-absorbing member 611.

The second cover 63*a* includes a second cover facing wall 631*a* and a second cover side wall 632. The second cover 63*a* is an annular member that covers at least the facing surface S1 of the shock-absorbing member 611. That is, the second cover 63*a* includes the annular second cover facing wall 631*a* and the annular second cover side wall 632. The second cover facing wall 631*a* is integrally formed with the second cover side wall 632, for example. The second cover facing wall 631*a* corresponds to a second wall. The second cover side wall 632 corresponds to a second side wall.

The second cover facing wall 631*a* is a portion arranged to face the facing surface S1 of the shock-absorbing member 611. Thus, the facing surface S1 of the shock-absorbing member 611 faces the circuit board 1 across the second cover facing wall 631*a*. The second cover facing wall 631*a* is attached to the shock-absorbing member 611 to be in contact with the facing surface S1. The second cover facing wall 631*a* of the second cover 63*a* covers the facing surface S1. Further, it is preferable that the second cover facing wall 631*a* entirely cover the facing surface S1. The second cover facing wall 631*a* of the present embodiment is a portion in contact with the circuit board 1.

The second cover side wall 632 protrudes from an end of the second cover facing wall 631*a*, for example. The second cover side wall 632 is a portion arranged to face at least a portion of the side surface S3 of the shock-absorbing member 611. In the present embodiment, as an example, the second cover side wall 632 is arranged to face a portion, in the thickness direction of the shock-absorbing member 611, of the side surface S3 of the shock-absorbing member 611.

As shown in FIG. 4, there is a distance between the first cover side wall 622 and the second cover side wall 632 such that the damper 6*a* can elastically deform in the thickness direction of the shock-absorbing member 611. That is, there is a gap between the first cover side wall 622 and the second cover side wall 632 when the first cover 62*a* and the second cover 63*a* are attached to the absorbing structure 61. The first cover 62*a* and the second cover 63*a* are connected through the height adjusting member 64, which will be described later. Except for the height adjusting member 64, the first cover 62*a* and the second cover 63*a* are not connected with each other.

Only one of the first cover side wall 622 and the second cover side wall 632 may be provided in the damper 6*a*. This can be appropriately applied to other embodiments and modifications.

The height adjusting member 64 corresponds to an adjusting member. The height adjusting member 64 is, for example, a tubular member. The height adjusting member 64 defines the cover opening portion 65. The height adjusting member 64 is arranged between the first cover 62*a* and the base 3*a*. More specifically, the height adjusting member 64 is in contact with an opening end of the first cover facing wall 621*a* and the base 3*a*. The opening end is an end where the first cover side wall 622 is not provided. In this embodiment, the base 3*a* is adopted as an example of a height reference portion.

The height adjusting member 64 is a member that adjusts the distance between the first cover 62*a* and the base 3*a*. Further, in other words, the height adjusting member 64 is provided to set the compressibility of the damper 6*a* to a desired value. That is, since the damper 6*a* includes the height adjusting member 64, it is possible to restrict the damper 6*a* from being compressed more than necessary by the second screw 202 and from losing the function of relaxing the stress to the circuit board 1.

As described above, the damper 6*a* includes the height adjusting member 64. Therefore, in the damper 6*a*, the second cover 63*a* moves in the up-down direction along with the displacement of the circuit board 1 that is caused by the distortion or stress of the circuit board 1. That is, the first cover 62*a* and the second cover 63*a* move closer to each other or away from each other.

However, in the present disclosure, the height adjusting member 64 may not be provided. In this case, the compressibility of the damper 6*a* can be adjusted by the thickness of the shock-absorbing member 611 (absorbing structure 61) and the viscosity of the protecting member 612*a*. The height adjusting member 64 may define slits in the up-down direction.

In this embodiment, the first cover 62*a*, the second cover 63*a*, and the height adjusting member 64, which are mainly composed of metal, are adopted. Thus, the first cover 62*a*, the second cover 63*a*, and the height adjusting member 64 have conductivity. That is, the first cover 62*a* and the second cover 63*a* are electrically connected to each other through the height adjusting member 64. However, the present disclosure is not limited to this, and may be composed mainly of a resin or the like.

The damper 6*a* may be arranged so that the second cover facing wall 631*a* faces a ground wiring that is a part of the wiring. In this case, the circuit board 1 is screwed to the base 3*a* with the second screws 202 and the damper 6*a* can be electrically connected to the circuit board 1 and the base 3*a*.

Therefore, the electronic controller 100 can electrically connect the ground wiring of the circuit board 1 and the base 3a through the damper 6a. That is, the damper 6a serves as an electrical connecting member in addition to a stress reliever.

<Effects>

As described above, in the damper 6a, the protecting member 612a is disposed on the side surface S3 of the shock-absorbing member 611. Therefore, the damper 6a can prevent foreign matters from adhering to the shock-absorbing member 611. Therefore, deterioration of the damper 6a can be suppressed.

Further, in the damper 6a, the protecting member 612a is also disposed in the spaces in the shock-absorbing member 611. Therefore, the damper 6a can restrict foreign matters from entering into the spaces in the shock-absorbing member 611 and from coming out from the damper 6a through the spaces in the shock-absorbing member 611. Thus, the damper 6a can restrict foreign matters from falling on the circuit board 1. Foreign matters that adhere to the damper 6a or enter into the damper 6a are substances containing water, salt, oil, and the like. Further, the foreign matters that come out from the spaces in the shock-absorbing member 611 are scrap metal and the like.

Further, since the damper 6a can restrict the foreign matters from falling from the damper 6a, it is possible to restrict malfunctions of the circuit board 1 caused by the fallen foreign matters. Thus, the damper 6a can suppress bad effects on electrical characteristics of the circuit board 1.

The electronic controller 100 includes the dampers 6a. The dampers 6a have the above-mentioned effects. Thus, the electronic controller 100 can reliably relax stress to the circuit board 1. Therefore, the electronic controller 100 can restrict stress from applying to the electronic components or a connecting portion between the electronic components and the insulating substrate. In addition, the electronic controller 100 can suppress bad effects on electrical characteristics of the circuit board 1.

More specifically, the circuit board 1 is supported by the base 3a with the second screws 202. However, the circuit board 1 is supported by the base 3a through the dampers 6a. Thus, when the circuit board 1 itself is distorted or an external force is applied to the circuit board 1, the damper 6a is elastically deformed and the circuit board 1 itself is displaced. Therefore, in the circuit board 1, it is possible to restrict the solder, the wiring pattern 42, and the like from being cracked or to restrict malfunctions of the electronic components.

Further, in the electronic controller 100, an influence caused by assembly distortion may be reduced by adjusting mounting positions of the electronic components. That is, in the electronic controller 100, the electronic components are mounted at positions away from screwing positions so as not to be affected by the assembly distortion. In this case, in the electronic controller 100, the distance between the screwing position and the electronic component may be a factor that obstructs high-density mounting. However, in the present embodiment, the influence of the assembly distortion is mitigated by the dampers 6a. Therefore, in the electronic controller 100, the electronic components can be mounted at high density.

In the present embodiment, a wire mesh is adopted as an example of the shock-absorbing member 611. Therefore, deterioration of the damper 6a over time can be restricted as compared with the case where rubber is used as the shock-absorbing member 611. However, the present disclosure is not limited to this. The shock-absorbing member 611 may be made of rubber or a spring.

When the shock-absorbing member 611 is made of rubber, the protecting member 612a may be a protecting member 612b which will be described later. When the shock-absorbing member 611 is a spring, the protecting member 612a may be provided by coating a surface of the spring as the shock-absorbing member 611.

In this embodiment, the second screw 202 is adopted as an example of the supporting element. However, in the present disclosure, a member using elastic deformation such as a snap fit can be adopted as the supporting element. Further, in the present embodiment, the circuit board 1 is adopted as an example of the supported member. However, in the present disclosure, the base 3a may be the supported member. In this case, the supporting member may be a vehicle frame or the like. Further, in the present disclosure, the cover 2a may be the supported member. In this case, the base 3a may be the supporting member. The first screw 201 can be adopted as a supporting element.

The circuit board 1 may be supported by the base 3a with the first screws 201 instead of the second screws 202. In this case, the first screw 201 corresponds to the supporting element. Next, with reference to FIGS. 7 to 13, first to seventh modifications of the first embodiment will be described.

(First Modification)

Figure 7:
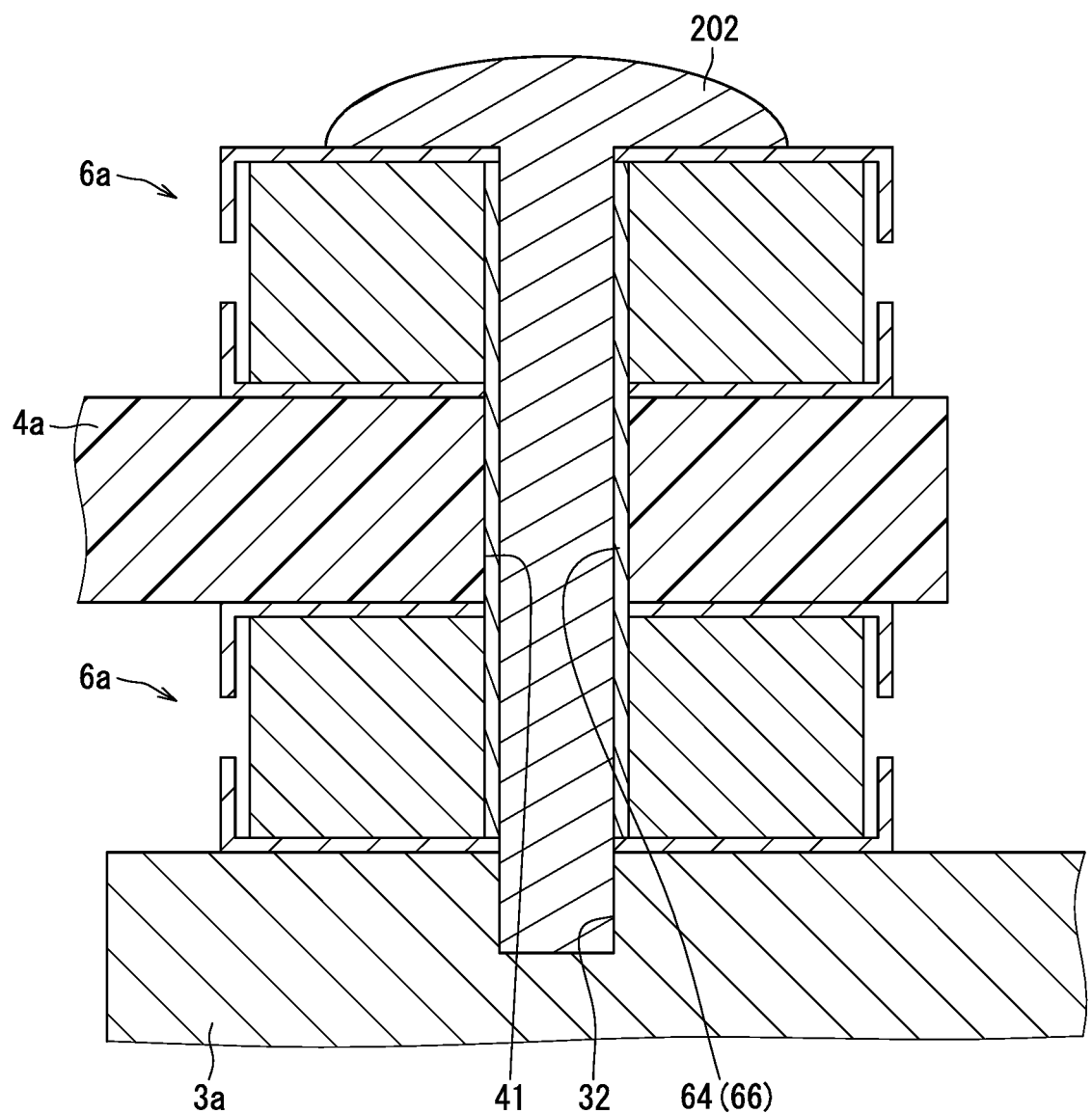
FIG. 7 is a cross-sectional view illustrating a schematic configuration of a damper of a first modification.

As shown in the first modification in FIG. 7, the dampers 6a may be provided to sandwich the circuit board 1. In the electronic controller 100 of this modification, the dampers 6a are disposed not only in the space between the circuit board 1 and the second screw 202 but also in the space between the circuit board 1 and the base 3a. That is, in the electronic controller 100, two dampers 6a are provided for the single second screw 202.

In this case, the two dampers 6a are connected through the height adjusting member 64 as a connecting portion 66. The height adjusting member 64 is arranged between the first cover 62a of one of the dampers 6a and the first cover 62a of the other of the dampers 6a. More specifically, the height adjusting member 64 is in contact with the opening ends of the first cover facing walls 621a of both of the dampers 6a. In this modification, the first cover facing wall 621a is adopted as an example of the height reference portion. When stress is applied to the circuit board 1, the circuit board 1 can be displaced in the up-down direction between the two dampers 6a. The first modification enables to exhibit effects similar to those of the first embodiment.

(Second Modification)

Figure 8:
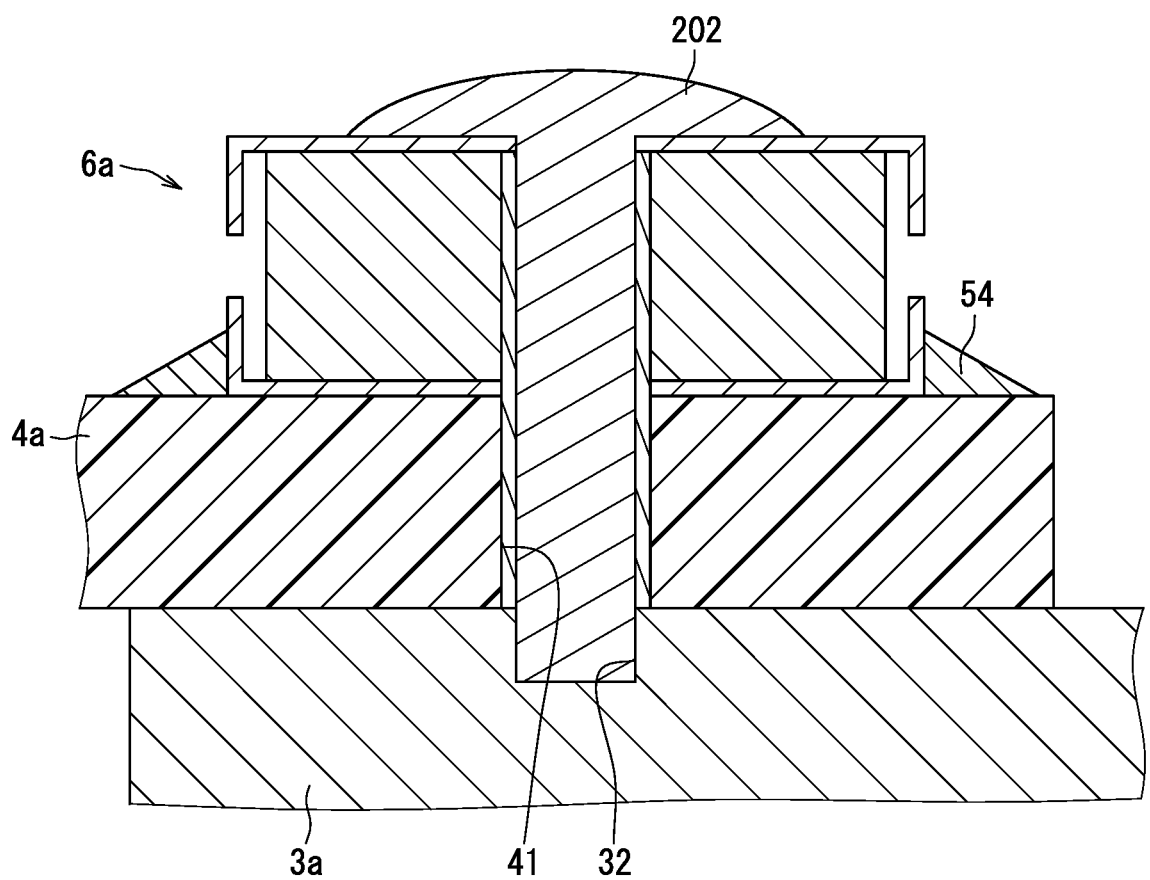
FIG. 8 is a cross-sectional view illustrating a schematic configuration of a damper of a second modification.

As shown in a second modification of FIG. 8, the damper 6a may be mounted on the circuit board 1 with the solder 54. The damper 6a is mounted on a mounting pattern 43 with the solder 54. In the damper 6a, the second cover 63a and the mounting pattern 43 are connected by the solder 54. As a result, the damper 6a is surface-mounted on the circuit board 1.

The mounting pattern 43 has conductivity. The mounting pattern 43 is provided on the surface of the insulating substrate 4a of the circuit board 1. The mounting pattern 43 may be a part of the wiring pattern 42, or may be separated from the wiring pattern 42. The solder 54 corresponds to a connecting member.

The structure in which the damper 6a is surface-mounted on the circuit board 1 with the solder 54 corresponds to an assembly. That is, in other words, the assembly includes the circuit board 1, the damper 6a, and the solder 54.

The second modification enables to exhibit effects similar to those of the first embodiment. Since the assembly includes the damper 6a, the stress to the circuit board 1 can be reliably relaxed. Since the damper 6a is surface-mounted on the circuit board 1 in the assembly, the damper 6a can be restricted from being displaced. That is, even if the damper 6a is not fixed with screws, the damper 6a is restricted from moving along the mounting surface of the circuit board 1. Thus, with the assembly, the damper 6a can be arranged at an appropriate position on the mounting surface of the circuit board 1.

(Third Modification)

Figure 9:
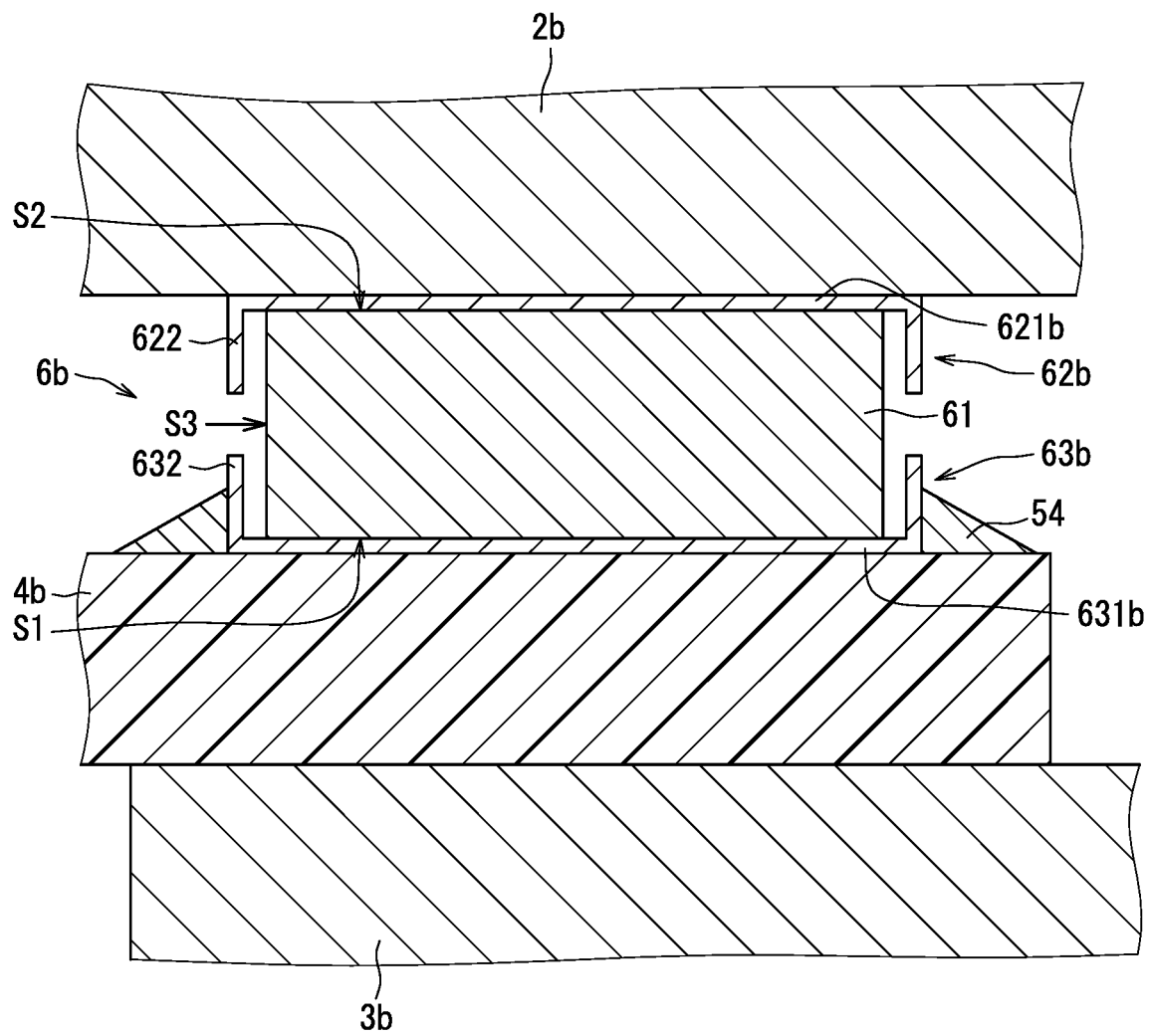
FIG. 9 is a cross-sectional view illustrating a schematic configuration of a damper of a third modification.

As shown in FIG. 9, a damper 6b of a third modification does not define the absorbing member hole 613 and the cover opening portion 65. The damper 6b is different from the damper 6a in these points. The damper 6b includes the absorbing structure 61, a first cover 62b having a flat plate-shaped first cover facing wall 621b, and a second cover 63b having a flat plate-shaped second cover facing wall 631b.

The damper 6b is supported by the cover 2b instead of the second screw 202. That is, the damper 6b is pressed by the cover 2b and supported on the circuit board 1. The cover 2b corresponds to a supporting element.

Thus, the base 3b does not define the second screw hole 32. Similarly, the insulating substrate 4b does not define the second insertion hole 41. The base 3b and the insulating substrate 4b are different from the base 3a and the insulating substrate 4a in these points.

The third modification enables to exhibit effects similar to those of the first embodiment. Further, the damper 6b can be downsized compared to the damper 6a by an area for the absorbing member hole 613 and the cover opening portion 65. In the electronic controller 100, electronic components can be mounted at a high density because the damper 6b can be downsized. The damper 6b does not have to be mounted with the solder 54.

(Fourth Modification)

Figure 10:
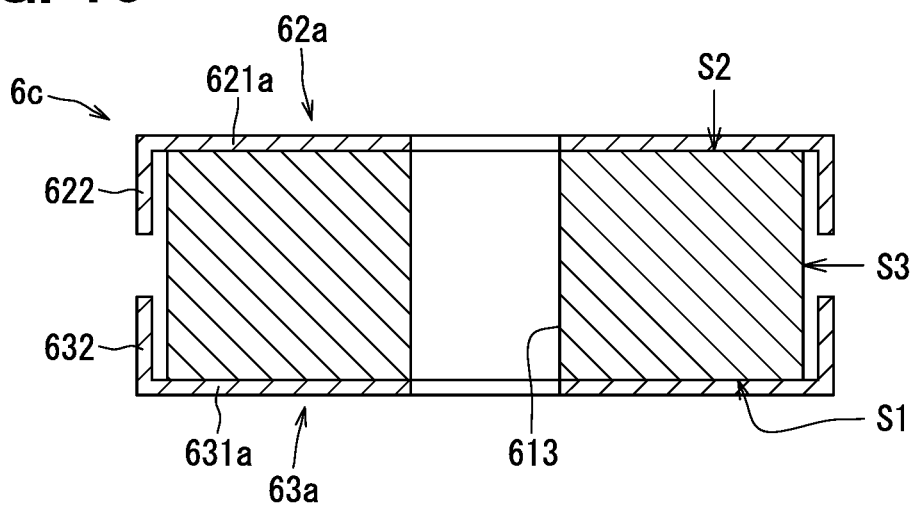
FIG. 10 is a cross-sectional view illustrating a schematic configuration of a damper of a fourth modification.

As shown in FIG. 10, a damper 6c of a fourth modification is different in that the damper 6c does not include the height adjusting member 64. The fourth modification enables to exhibit effects similar to those of the first embodiment.

(Fifth Modification)

Figure 11:
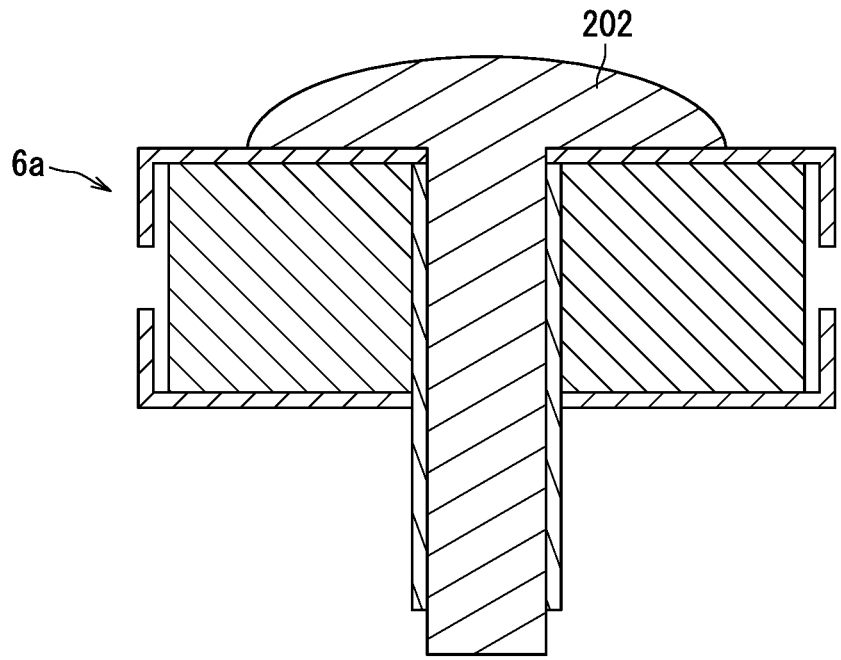
FIG. 11 is a cross-sectional view illustrating a schematic configuration of a damper of a fifth modification.

As shown in FIG. 11, the damper 6a of a fifth modification is integrally formed with the second screw 202. The fifth modification enables to exhibit effects similar to those of the first embodiment.

(Sixth Modification)

Figure 12:
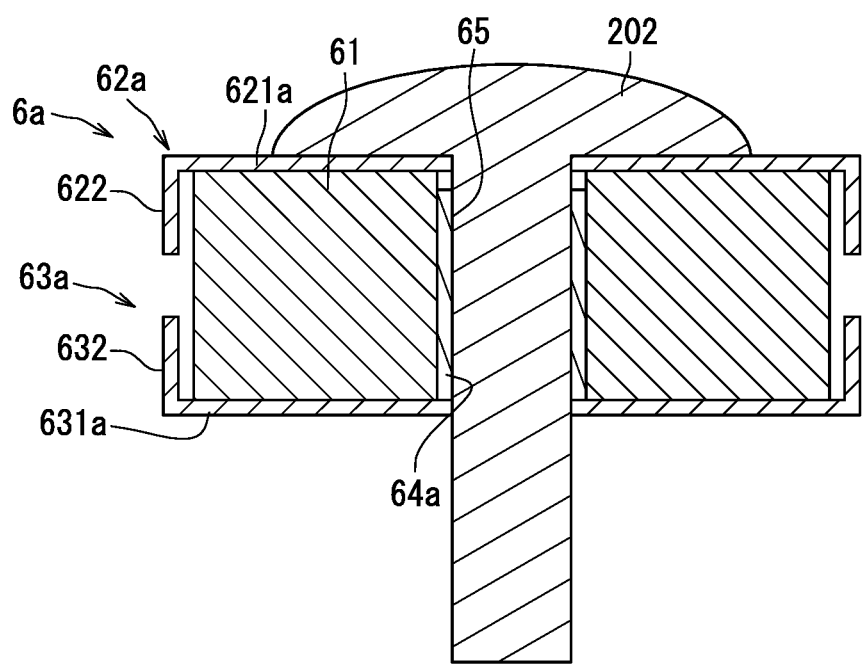
FIG. 12 is a cross-sectional view illustrating a schematic configuration of a damper of a sixth modification.

As shown in FIG. 12, the damper 6a of a sixth modification is different from that of the first embodiment in the configuration of a height adjusting member 64a. In this modification, for convenience, the reference numeral for the damper is the same as that in the above embodiment.

The height adjusting member 64a corresponds to an adjusting member. The height adjusting member 64a is, for example, a tubular member. The height adjusting member 64a defines the cover opening portion 65. The height adjusting member 64a is arranged between the first cover 62a and the second cover 63a. In this embodiment, the second cover 63a is adopted as an example of the height reference portion. Similar to the height adjusting member 64, the height adjusting member 64a may define a slit in the up-down direction.

More specifically, the height adjusting member 64a is arranged between the opening end of the first cover facing wall 621a and the opening end of the second cover facing wall 631a. Further, the height adjusting member 64a is shorter than the distance between the first cover facing wall 621a and the second cover facing wall 631a. Therefore, the height adjusting member 64a is in contact with only one of the first cover facing wall 621a and the second cover facing wall 631a. Further, when the damper 6a is fixed with the second screw 202 and the circuit board 1 is not displaced in the up-down direction, the height adjusting member 64a is configured to be in contact with only one of the first cover facing wall 621a and the second cover facing wall 631a. In this modification, as an example, the height adjusting member 64a is in contact with only the second cover facing wall 631a and defines a space between the first cover facing wall 621a and the height adjusting member 64a. The distance between the first cover facing wall 621a and the height adjusting member 64a is a movable distance of the damper 6a when the first cover 62a and the second cover 63a move relative to each other.

The height adjusting member 64a has the same function as the height adjusting member 64. Further, the height adjusting member 64a can define the distance between the first cover 62a and the second cover 63a when the circuit board 1 is displaced in the up-down direction. That is, in the damper 6a, the height adjusting member 64a defines the distance in which the first cover 62a is located closest to the second cover 63a along with the displacement of the circuit board 1. The sixth modification enables to exhibit effects similar to those of the first embodiment.

(Seventh Modification)

Figure 13:
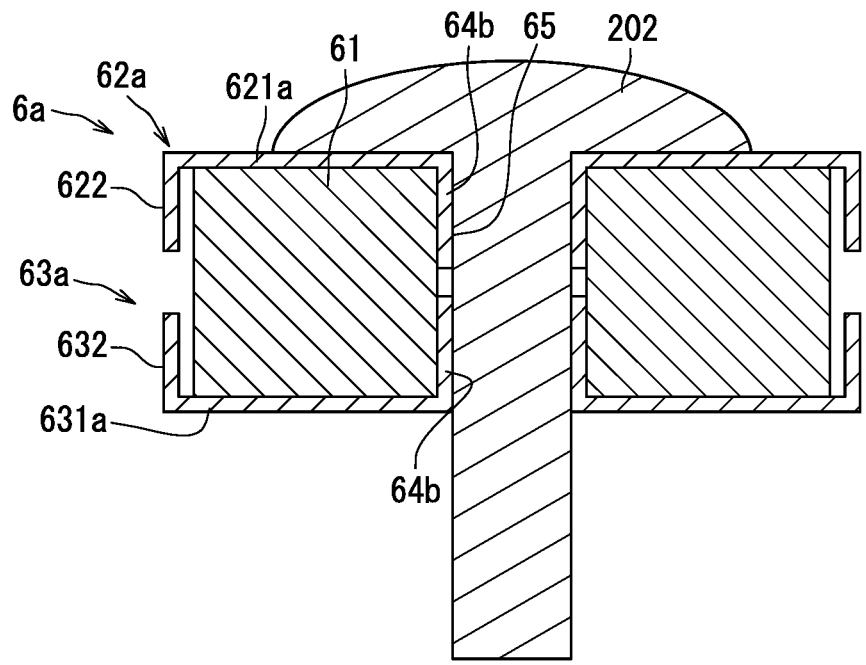
FIG. 13 is a cross-sectional view illustrating a schematic configuration of a damper of a seventh modification.

As shown in FIG. 13, the damper 6b of a seventh modification is different from the sixth modification in the configuration of the height adjusting member. Specifically, the height adjusting member 64b is different from the height adjusting member 64a in that the height adjusting member 64b is integrally formed with the first cover 62a and the second cover 63b.

The height adjusting member 64b is located at each of the opening end of the first cover facing wall 621a and the opening end of the second cover facing wall 631a. The first cover 62a includes the height adjusting member 64b protruding from the opening end of the first cover facing wall 621a toward the second cover facing wall 631a. The second cover 63a includes the height adjusting member 64b protruding from the opening end of the second cover facing wall 631a toward the first cover facing wall 621a. Both of the height adjusting members 64b are provided at an interval therebetween. The distance between the height adjusting member 64b of the first cover 62a and the height adjusting member 64b of the second cover 63a is shorter than the distance between the first cover side wall 622 and the second cover side wall 632. The height adjusting members 64b have the same function as the height adjusting member 64a. The seventh modification enables to exhibit similar effects as those of the sixth embodiment.

The preferred embodiment of the present disclosure has been described above. However, the present disclosure is not limited in any way to the above-mentioned embodiment, and various modifications can be performed without departing from the spirit of the present disclosure. Hereinafter, second to fifth embodiments and modifications of them will be described as other embodiments of the present disclosure. The above-described embodiment, the second to fifth embodiments, and the modifications can be carried out independently or in combination as appropriate. The present disclosure is not limited to the combinations shown in the embodiments, but can be implemented by various combinations. In the drawings relating to the following embodiments, some reference numerals may be omitted to simplify the drawings.

Second Embodiment

Figure 14:
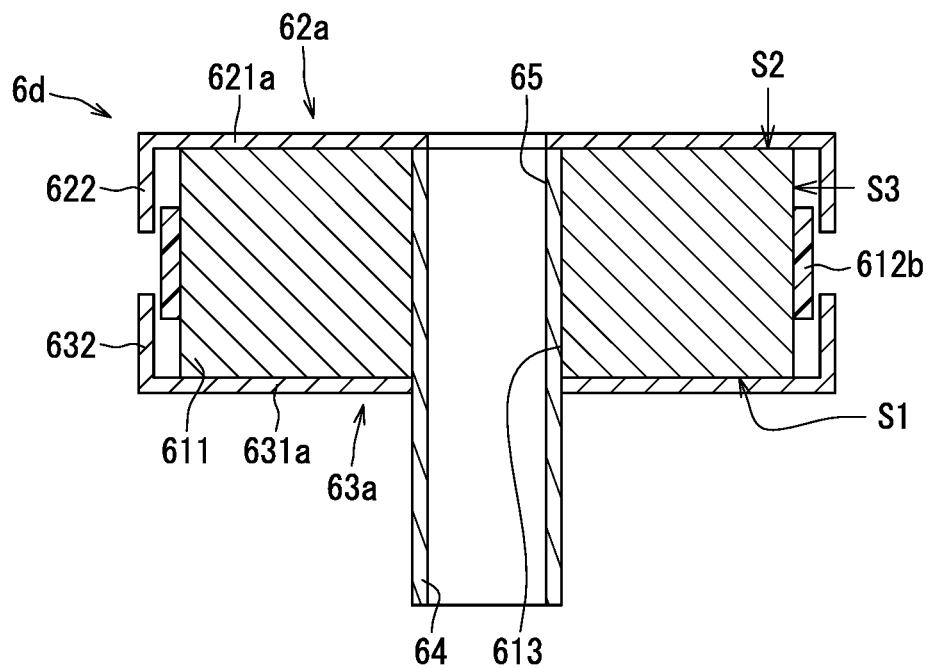
FIG. 14 is a cross-sectional view illustrating a schematic configuration of a damper of a second embodiment.

With reference to FIG. 14, a damper 6d of the second embodiment will be described. The damper 6d is different from those in the first embodiment and the first to seventh modifications in the configuration of the protecting member.

The damper 6d includes the shock-absorbing member 611 and a protecting member 612b. The protecting member 612b is located to entirely cover the circumference of the shock-absorbing member 611. Further, the protecting member 612b is located on only a part of the side surface S3 of the shock-absorbing member 611 in the thickness direction of the shock-absorbing member 611. The protecting member 612b is disposed to face a gap between the first cover side wall 622 and the second cover side wall 632. The protecting member 612b is not disposed in the spaces in the shock-absorbing member 611, unlike the protecting member 612a.

The protecting member 612b is provided in contact with the side surface S3 of the shock-absorbing member 611. The protecting member 612b may be made of a viscous material. The protecting member 612b is, for example, gel or rubber. The protecting member 612b may be an annular member. The protecting member 612b is attached to the shock-absorbing member 611 with contraction force of the protecting member 612b or the like. The protecting member 612b may be attached to the shock-absorbing member 611 with an adhesive or the like. Further, the protecting member 612b may be attached to the shock-absorbing member 611 by coating or the like.

The present disclosure is not limited to this, the protecting member 612b may be composed of multiple members. Further, the protecting member 612b is not limited to this, and may be anything as long as it does not impair the elastic deformation of the shock-absorbing member 611.

The damper 6b enables to exhibit similar effects as those of the damper 6a. The protecting member 612b of the damper 6d can be attached to the shock-absorbing member 611 more easily than that of the damper 6a. Further, the electronic controller including the damper 6d can exhibit similar effects as those of the electronic controller 100.

The damper 6d can also be implemented in combination with each of the first to seventh modifications. The damper 6d may be provided on both sides of the circuit board 1 as in the first modification. The damper 6d may be surface-mounted as in the second modification. The damper 6d may not define the absorbing member hole 613 and the cover opening portion 65, as in the third modification. The damper 6d may not include the height adjusting member 64 as in the fourth modification. The damper 6d may be integrally formed with the second screw 202 as in the fifth modification. The damper 6d may include the height adjusting members 64a and 64b similar to those of the sixth and seventh modifications.

Similar to the damper 6a, the damper 6d may include the protecting member 612a in the spaces in the shock-absorbing members 611. That is, the damper 6d may include the protecting members 612a and 612b. As a result, the damper 6d can further suppress foreign matters from adhering to the shock-absorbing member 611 and from falling from the shock-absorbing member 611, as compared with the damper 6a and the like. This configuration can also be adopted in other embodiments and modifications.

Here, with reference to FIGS. 15 and 16, an eighth modification and a ninth modification that are modified from the second embodiment will be described.

(Eighth Modification)

Figure 15:
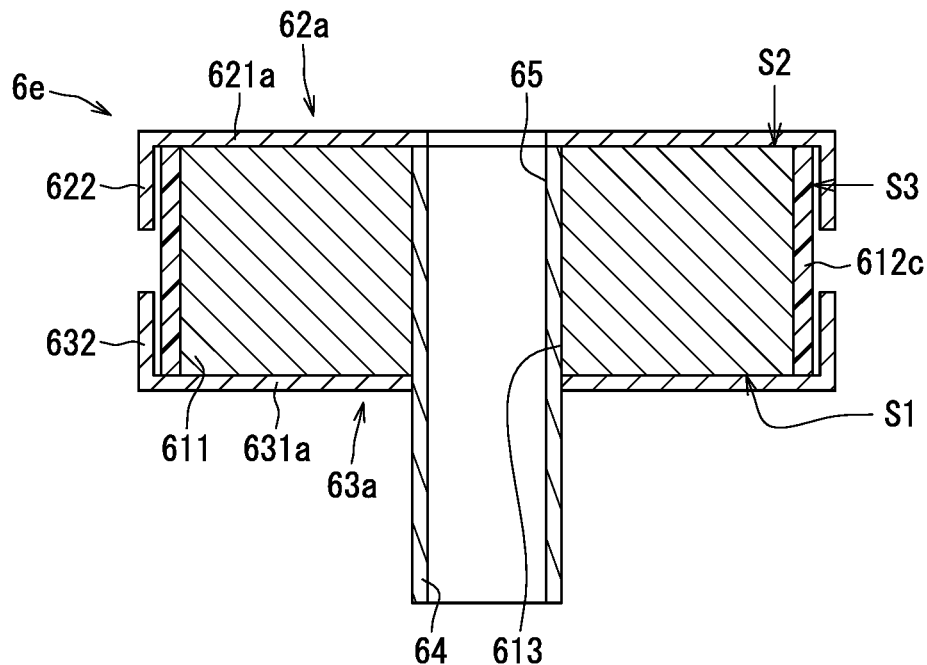
FIG. 15 is a cross-sectional view illustrating a schematic configuration of a damper of an eighth modification.

As shown in FIG. 15, a damper 6e is different from the damper 6d in the position of the protecting member. The damper 6e includes the shock-absorbing member 611 and the protecting member 612c. The protecting member 612c is provided to entirely cover the circumference of the shock-absorbing member 611. Further, the protecting member 612c is provided to entirely cover the side surface S3 of the shock-absorbing member 611 in the thickness direction of the shock-absorbing member 611. That is, the protecting member 612c entirely covers the side surface S3 of the shock-absorbing member 611.

The damper 6e enables to exhibit similar effects as those of the damper 6d. Further, the electronic controller including the damper 6e can exhibit similar effects as those of the electronic controller 100. Further, the eighth modification can be implemented in combination with each of the first to seventh modifications as in the second embodiment.

(Ninth Modification)

Figure 16:
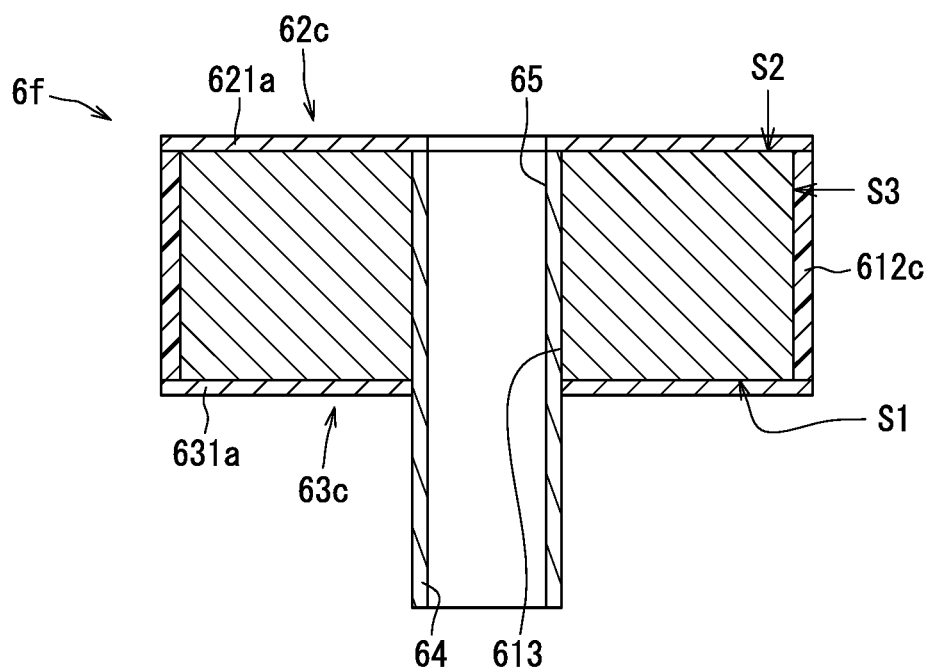
FIG. 16 is a cross-sectional view illustrating a schematic configuration of a damper of a ninth modification.

As shown in FIG. 16, a damper 6f is different from the damper 6e in the configurations of the first cover and the second cover. The damper 6f includes a first cover 62c and a second cover 63c. The first cover 62c includes the first cover facing wall 621a. The first cover 62c is different from the first cover 62a in that the first cover 62c does not include the first cover side wall 622. The second cover 63c includes the second cover facing wall 631a. The second cover 63c is different from the second cover 63a in that the second cover 63c does not include the second cover side wall 632.

The damper 6f enables to exhibit similar effects as those of the damper 6e. Further, the electronic controller including the damper 6f can exhibit similar effects as those of the electronic controller 100. Further, the ninth modification can be implemented in combination with each of the first to seventh modifications as in the second embodiment.

Third Embodiment

Figure 17:
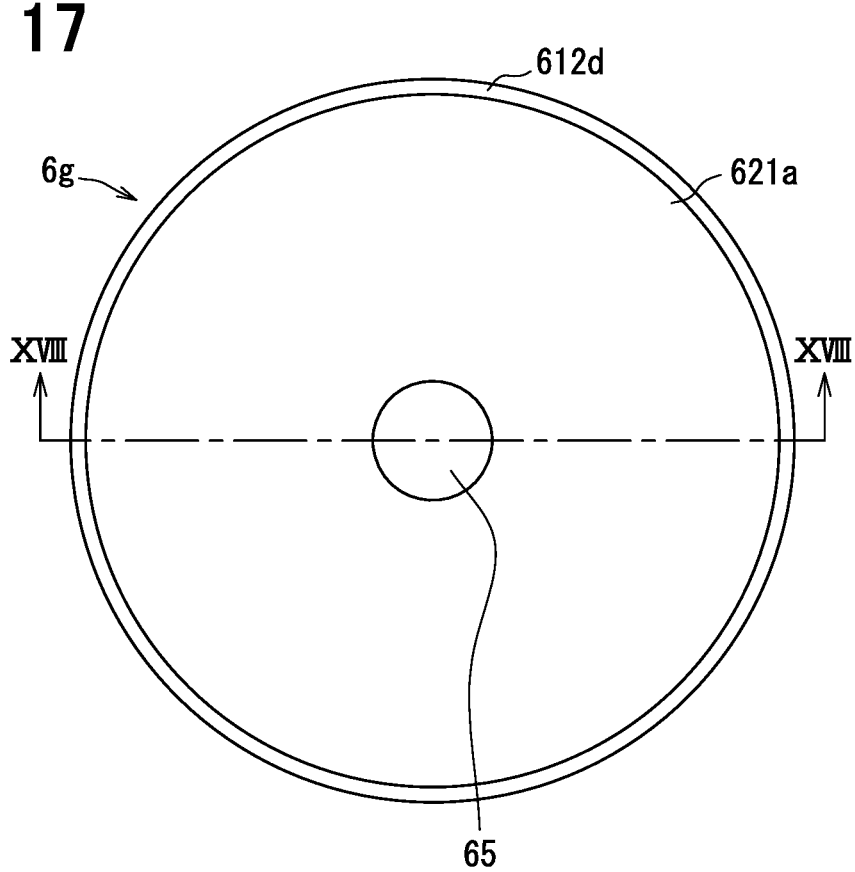
FIG. 17 is a plan view illustrating a schematic configuration of a damper of a third embodiment.
Figure 18:
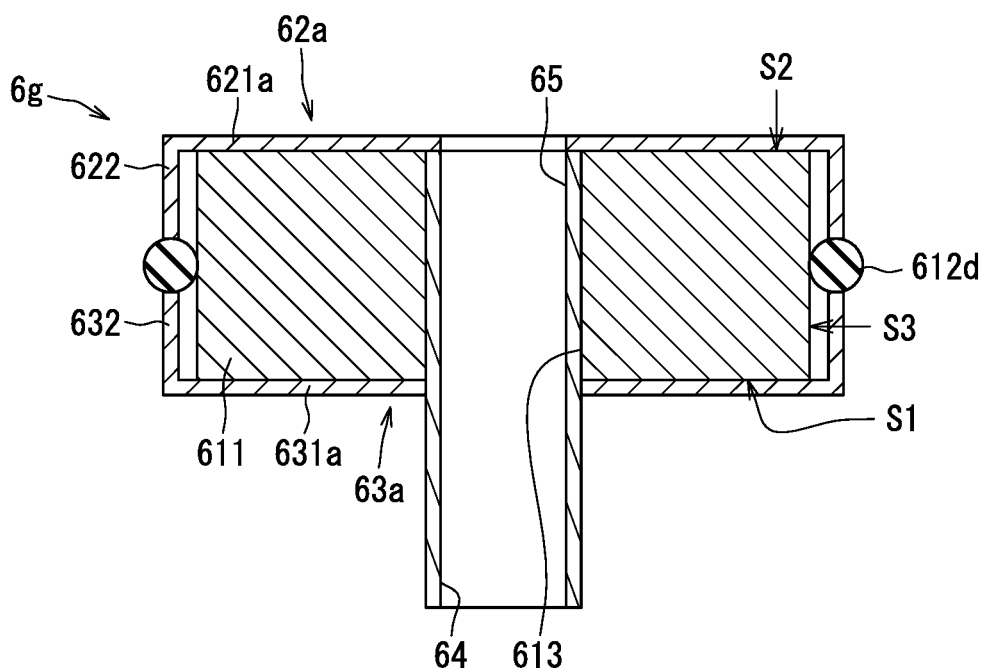
FIG. 18 is a cross-sectional view taken along a line XVIII-XVIII in FIG. 17.

With reference to FIGS. 17 and 18, a damper 6g of a third embodiment will be described. The damper 6g is different from the above embodiments and modifications in the configuration of the protecting member.

A protecting member 612d of the damper 6g is annularly provided. The protecting member 612d has viscoelasticity. The protecting member 612d is composed of one or more members. In this embodiment, as an example, an O-ring is used as the protecting member 612d. The protecting member 612d is disposed in a gap between the first cover side wall 622 and the second cover side wall 632. In other words, the protecting member 612d is wound around the first cover 62a and the second cover 63a.

The protecting member 612d is not limited to this, and may be anything as long as it does not impair the elastic deformation of the shock-absorbing member 611. The protecting member 612d may be configured as multiple members arranged annularly.

The damper 6g enables to exhibit similar effects as those of the damper 6a. Further, the electronic controller including the damper 6g can exhibit similar effects as those of the electronic controller 100.

Fourth Embodiment

With reference to FIG. 19, a damper 6h of a fourth embodiment will be described. The damper 6h is different from the second embodiment in that the damper 6h does not include the first cover 62a and the second cover 63a.

The damper 6h includes the shock-absorbing member 611 and the protecting member 612c. The damper 6h is the same as the configuration in which the first cover 62a and the second cover 63a are excluded from the damper 6e of the eighth modification.

However, the facing surface S1 of the damper 6h is covered with the circuit board 1 and the opposite surface S2 of the damper 6h is covered with the screw head of the second screw 202 when the damper 6h is fixed with the second screw 202. Thus, the second screw 202 has a function as the first cover 62a. On the other hand, the circuit board 1 has a function as the second cover 63a.

In this embodiment, the second screw 202 is located within a facing area of the damper 6h. The facing area is an area overlapping the shock-absorbing member 611 in the thickness direction. That is, the outer diameter of the second screw 202 is located inside the damper 6h.

The damper 6h enables to exhibit similar effects as those of the damper 6d when supported by the circuit board 1 with the second screw 202. The electronic controller including the damper 6g can exhibit similar effects as those of the electronic controller 100.

In this embodiment, an example including the height adjusting member 64 is adopted. However, in the present disclosure, the height adjusting member 64 may be omitted.

Here, with reference to FIGS. 20 and 21, a tenth modification and an eleventh modification that are modified from the fourth embodiment will be described.

(Tenth Modification)

As shown in FIG. 20, a damper 6i of a tenth modification is different from the damper 6h in size of the second screw 202. The outer diameter of the second screw 202 is located outside of the damper 6i. The damper 6i is located within a facing area of the screw head of the second screw 202. The facing area is an area overlapping the screw head in the thickness direction of the shock-absorbing member 611.

The damper 6i enables to exhibit similar effects as those of the damper 6h. Further, the electronic controller including the damper 6i can exhibit similar effects as those of the electronic controller 100.

(Eleventh Modification)

Figure 21:
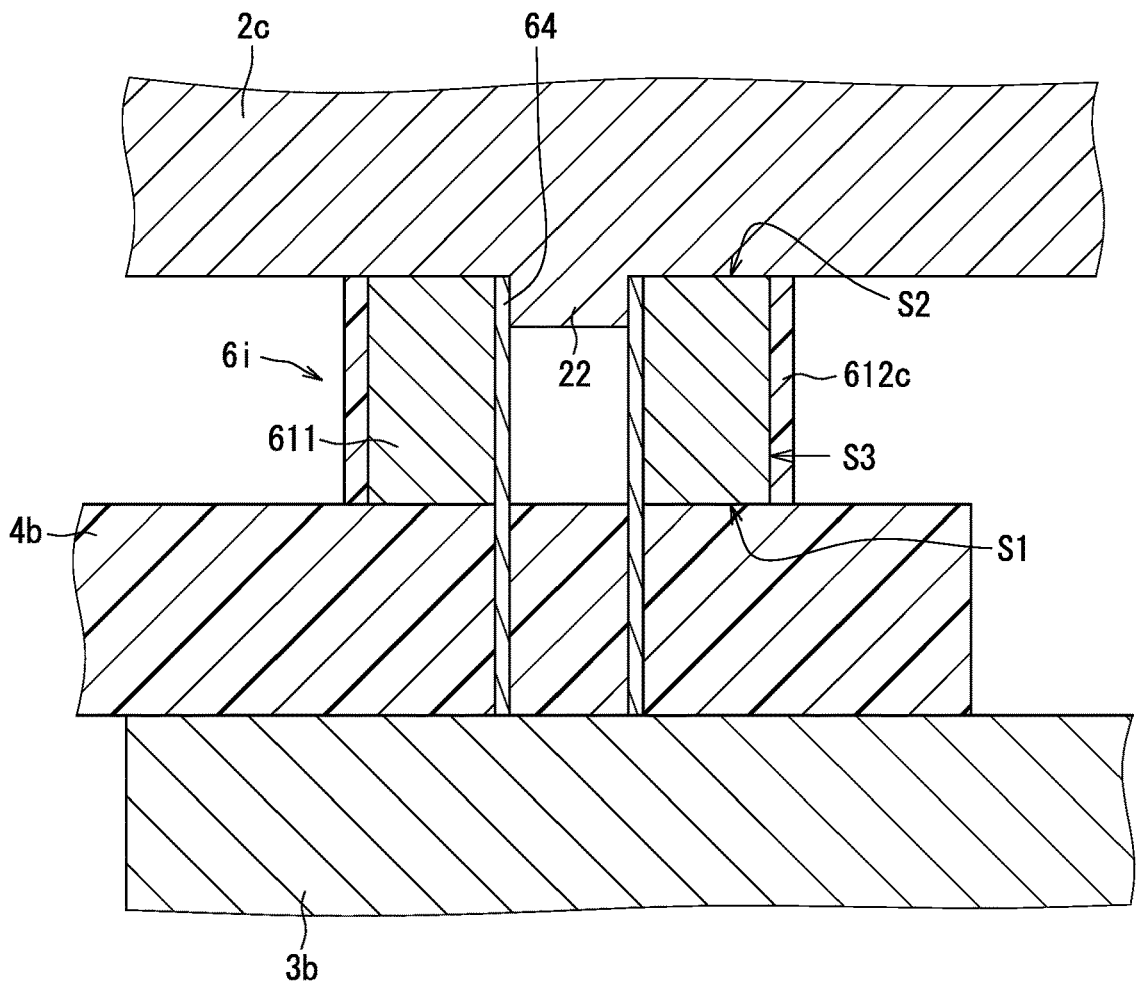
FIG. 21 is a cross-sectional view illustrating a schematic configuration of a damper of an eleventh modification.

As shown in FIG. 21, a damper 6i of the eleventh modification is different from the tenth modification in that the damper 6i is supported by the cover 2c instead of the second screw 202. The cover 2c is different from the cover 2b in that the cover 2c includes a protrusion 22. That is, the electronic controller 100 of the eleventh modification is different from the electronic controller 100 of the third modification in including the cover 2c. Thus, the cover 2c corresponds to a supporting element.

The cover 2c includes the protrusion 22. The cover 2c supports the damper 6i with the protrusion 22 inserted into the cover opening portion 65. As a result, in the electronic controller 100 of the eleventh modification, the damper 6i can be restricted from being displaced.

The electronic controller of the eleventh modification can exhibit similar effects as those of the electronic controller 100. The electronic controller of the eleventh modification can exhibit similar effects as those of the electronic controller of the third modification. The insulating substrate 4b may define a through hole into which only the height adjusting member 64 is inserted, or may define the second insertion hole 41.

Fifth Embodiment

Figure 22:
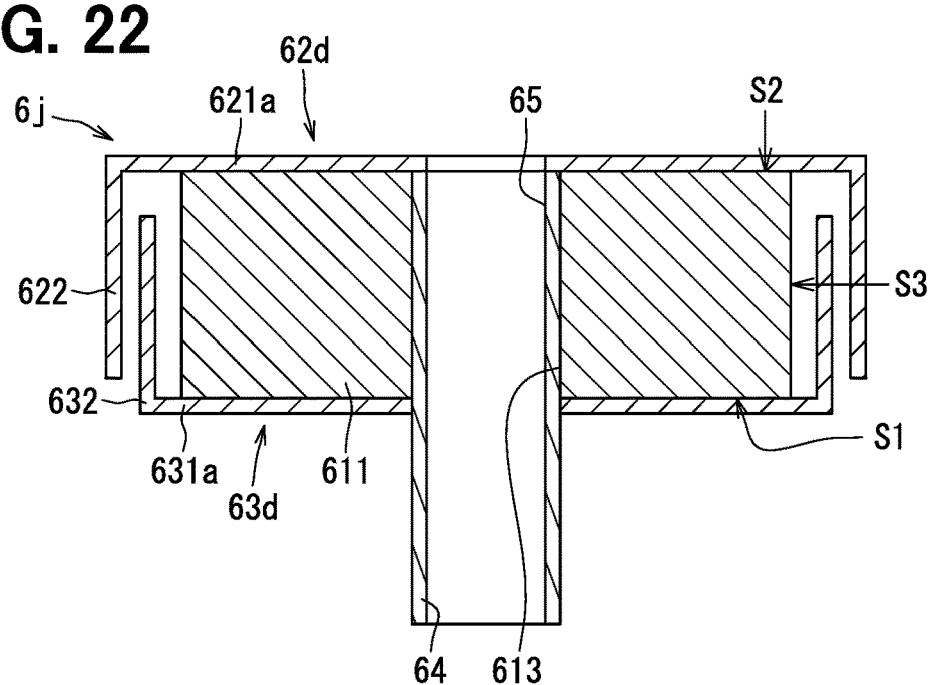
FIG. 22 is a cross-sectional view illustrating a schematic configuration of a damper according to a fifth embodiment.

With reference to FIG. 22, a damper 6j of a fifth embodiment will be described. The damper 6j is different from the first embodiment and the first to seventh modifications in that the damper 6j does not include the protecting member 612a and include covers 62d and 63d that have different configurations from the above embodiments and modifications.

Like the first cover 62a, the first cover 62d includes the first cover facing wall 621a and the first cover side wall 622. Like the second cover 63a, the second cover 63d includes the second cover facing wall 631a and the second cover side wall 632.

The first cover 62d and the second cover 63d are arranged so that the first cover side wall 622 and the second cover side wall 632 face each other. The second cover side wall 632 is arranged in a facing area that faces the side surface S3 of the shock absorbing member 611 and the first cover side wall 622. Further, the first cover side wall 622 and the second cover side wall 632 are arranged to face each other in a direction perpendicular to the thickness direction of the shock-absorbing member 611. In other words, the first cover side wall 622 of the first cover 62d and the second cover side wall 632 of the second cover 63d form a labyrinth structure.

As a result, the damper 6j defines an opening portion between the first cover side wall 622 and the second cover side wall 632. The opening portion opens at the second cover 63d side and extends toward the first cover 62d. Further, in other words, there is a gap between the first cover side wall 622 and the second cover side wall 632 and the gap extends in the thickness direction of the shock-absorbing member 611.

Thus, the damper 6j defines the opening portion facing the circuit board 1 when the damper 6j is arranged on the circuit board 1. In other words, the damper 6j defines an opening in the gravity direction when the damper 6j is arranged on the circuit board 1.

Further, the first cover side wall 622 is provided outside the second cover side wall 632. That is, the second cover side wall 632 is provided closer to the shock-absorbing member 611 than the first cover side wall 622 is to the shock-absorbing member. That is, the second cover side wall 632 is located between the first cover side wall 622 and the shock-absorbing member 611.

The damper 6j enables to exhibit similar effects as those of the damper 6a. The electronic controller including the damper 6j can exhibit similar effects as those of the electronic controller 100.

Further, the damper 6j defines the opening portion at a position facing the circuit board 1. Thus, foreign mattes that come out from the spaces in the shock-absorbing member 611 are restricted from accumulating inside the covers 62d and 63d.

However, the present disclosure is not limited to this. The second cover side wall 632 may be provided outside the first cover side wall 622. In this case, when the damper 6j is arranged on the circuit board 1, an area of the damper 6j facing the circuit board 1 is closed. That is, when the damper 6j is arranged on the circuit board 1, the opening portion is provided at a position that does not face the circuit board 1.

This also allows the damper 6j to have similar effects as those of the damper 6a. Then, the electronic controller including the damper 6j can exhibit similar effects as those of the electronic controller 100. Further, since the damper 6j does not define the opening portion at a position facing the circuit board 1, foreign matters coming out from the spaces in the shock-absorbing member 611 can be restricted from falling on the circuit board 1. Thus, the damper 6j can suppress malfunctions of the circuit board 1. In particular, it is preferable that the damper 6j be arranged on the circuit board 1 such that the opening portion opens in a direction opposite to the gravity direction.

Although the present disclosure has been described in accordance with the embodiments, it is understood that the present disclosure is not limited to such embodiments or structures. The present disclosure encompasses various modifications and variations within the scope of equivalents. In addition, while the various elements are shown in various combinations and configurations, which are exemplary, other combinations and configurations, including more, less or only a single element, are also within the spirit and scope of the present disclosure.

What is claimed is:

1. A damper disposed in at least one of a space between a supported member and a supporting element or a space between the supported member and a supporting member, the damper comprising:
a cushioning member configured to relax stress applied to the supported member that is supported by the supporting member together with the supporting element, the cushioning member including a facing portion that faces the supported member, an opposite portion that is opposite to the facing portion, and a side surface portion that is located between the facing portion and the opposite portion; and
a protecting member disposed on the side surface portion to cover the cushioning member from an outside of the cushioning member, wherein
the cushioning member is formed by weaving metal wires such that a plurality of spaces are defined in the cushioning member, and
the protecting member is disposed in the plurality of spaces in the cushioning member.

2. The damper according to claim 1, wherein
the protecting member is disposed to entirely cover the side surface portion.

3. The damper according to claim 1, wherein
the protecting member is made of a viscous material.

4. The damper according to claim 1, wherein
the protecting member has an annular shape made of a viscoelastic material.

5. The damper according to claim 1, wherein
the cushioning member defines a through hole into which a portion of the supporting element is inserted.

6. The damper according to claim 1, further comprising:
a first cover covering the opposite portion of the cushioning member;
a second cover covering the facing portion of the cushioning member; and
an adjusting member disposed between the first cover and a height reference portion and configured to adjust a distance between the first cover and the height reference portion.

7. An assembly comprising:
the damper and the supported member according to claim 6; and
a conductive connecting member connecting the damper to the supported member, wherein
the second cover of the damper has a conductivity,
a conductive mounting pattern is mounted on a surface of the supported member, and
the conductive connecting member connects the second cover of the damper to the conductive mounting pattern of the supported member, so that the damper is mounted on the surface of the supported member.

8. An electronic controller comprising:
the damper, the supported member, the supporting member, and the supporting element according to claim 1, wherein
the supported member is a circuit board in which an electronic component and a conductive wiring are provided at an insulating substrate that has an electric insulation property, and
the damper is disposed in at least one of a space between the circuit board and the supporting element or a space between the circuit board and the supporting member, and
the circuit board is supported by the supporting member.

* * * * *